(12) United States Patent
Yoeda et al.

(10) Patent No.: US 6,997,146 B2
(45) Date of Patent: Feb. 14, 2006

(54) START CONTROL METHOD AND APPARATUS FOR SOLENOID-OPERATED VALVES OF INTERNAL COMBUSTION ENGINE

(75) Inventors: Keiji Yoeda, Numazu (JP); Shigeo Kikori, Toyota (JP); Tomohiro Oda, Susono (JP); Hitoshi Akimoto, Setagaya-ku (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 71 days.

(21) Appl. No.: 10/423,976

(22) Filed: Apr. 28, 2003

(65) Prior Publication Data

US 2003/0217714 A1 Nov. 27, 2003

(30) Foreign Application Priority Data

May 22, 2002 (JP) .................................. 2002-147382
Mar. 25, 2003 (JP) .................................. 2003-082936

(51) Int. Cl.
F01L 9/04 (2006.01)

(52) U.S. Cl. ............................. 123/90.11; 251/129.09; 251/129.1; 251/129.15

(58) Field of Classification Search ............. 123/90.11; 251/129.09, 129.1, 129.15, 129.16
See application file for complete search history.

(56) References Cited

U.S. PATENT DOCUMENTS

| 4,065,096 | A | | 12/1977 | Frantz et al. |
| 4,382,240 | A | * | 5/1983 | Kondo et al. .................. 335/8 |
| 5,669,341 | A | * | 9/1997 | Ushirono et al. ......... 123/90.11 |
| 5,930,992 | A | * | 8/1999 | Esch et al. ..................... 60/274 |
| 5,996,539 | A | * | 12/1999 | Gobel et al. ............. 123/90.11 |
| 6,024,059 | A | * | 2/2000 | Kamimaru et al. ....... 123/90.11 |
| 6,026,771 | A | * | 2/2000 | Escobosa .................. 123/90.12 |
| 6,070,853 | A | * | 6/2000 | Stolk et al. ............ 251/129.18 |
| 6,082,315 | A | | 7/2000 | Schneider |
| 6,089,197 | A | | 7/2000 | Lange et al. |
| 6,125,803 | A | | 10/2000 | Hattori et al. |
| 6,230,673 | B1 | | 5/2001 | Sugimoto et al. |
| 6,230,674 | B1 | | 5/2001 | Hattori et al. |
| 6,257,182 | B1 | | 7/2001 | Hara et al. |
| 6,289,858 | B1 | | 9/2001 | Altdorf et al. |
| 6,304,161 | B1 | | 10/2001 | Schebitz et al. |
| 6,354,253 | B1 | | 3/2002 | Katsumata et al. |
| 6,494,172 | B1 | * | 12/2002 | Komatsu et al. ......... 123/90.11 |
| 6,553,966 | B1 | * | 4/2003 | Cornell et al. ............... 123/446 |
| 2001/0047780 | A1 | * | 12/2001 | Komatsu et al. ......... 123/90.11 |
| 2003/0217714 | A1 | | 11/2003 | Yoeda et al. |

FOREIGN PATENT DOCUMENTS

| JP | U 60-47808 | | 4/1985 |
| JP | A 61-96110 | | 5/1986 |
| JP | B2 61-53533 | | 11/1986 |
| JP | 10288014 A | * | 10/1998 |
| JP | A 2000-97057 | | 4/2000 |
| JP | A 2000-97059 | | 4/2000 |
| JP | A 2000-248968 | | 9/2000 |
| JP | A 2000-303807 | | 10/2000 |
| JP | A 2001-254609 | | 9/2001 |

* cited by examiner

Primary Examiner—Thomas Denion
Assistant Examiner—Jaime Corrigan
(74) Attorney, Agent, or Firm—Oliff & Berridge, PLC

(57) ABSTRACT

In method and apparatus for controlling starting of a solenoid-operated valve for an internal combustion engine, when a request for a start of the solenoid-operated valve is generated, a provisional target position to which an armature is likely to be moved is determined, and the armature is moved to the determined provisional target position. If the provisional target position is difference from a predetermined target position, the armature is moved to the target position after being moved from the neutral position to the provisional target position.

33 Claims, 20 Drawing Sheets

START CONTROL METHOD AND APPARATUS FOR SOLENOID-OPERATED VALVES OF INTERNAL COMBUSTION ENGINE

INCORPORATION BY REFERENCE

The disclosures of Japanese Patent Applications No. 2002-147382 filed on May 22, 2002 and No. 2003-082936 filed on Mar. 25, 2002, each including the specification, drawings and abstract, are incorporated herein by reference in their entireties.

BACKGROUND OF THE INVENTION

1. Field of the Invention

The invention generally relates to solenoid-operated valves for use in internal combustion engines, and particularly relates to technologies for starting the solenoid-operated valves in favorable manners.

2. Description of Related Art

Solenoid-operated valves for an internal combustion engine installed on a vehicle, such as an automobile, are known which are operable to drive intake valves and/or exhaust valves for opening and closing the same by utilizing electromagnetic force. Each of the solenoid-operated valves includes an armature that moves along with a valve body of an intake valve or an exhaust valve, a valve-opening spring that urges the armature in a direction to open the valve, a valve-closing spring that urges the armature in a direction to close the valve, a valve-opening electromagnet that generates electromagnetic force for opening the valve against the bias force of the valve-closing spring, and a valve-closing electromagnet that generates electromagnetic force for closing the valve against the valve-opening spring.

When the solenoid-operated valve is not actuated, namely, when no exciting current is applied to the valve-opening electromagnet and the valve-closing electromagnet, the armature is resiliently supported at a neutral position at which the bias forces of the valve-opening spring and the valve-closing spring are balanced with each other.

Since the valve body is half-open when the armature is located at the neutral position, the armature needs to be moved to its opening-side terminal position at which the valve body is fully open, or to its closing-side terminal position at which the valve body is fully closed, when the internal combustion engine is started, for example.

One example of a method of moving the armature to the opening-side terminal position or the closing-side terminal position at the time of a start of the engine, or the like, is disclosed in, for example, Japanese Laid-open Patent Publication No. 2000-97059. In this publication, it is proposed to move armatures of a plurality of solenoid-operated valves from the neutral position to the opening-side terminal position upon turn-on of an ignition switch, hold the armatures at the opening-side terminal position, and successively move the armatures to the closing-side terminal position in a predetermined order in which the cylinders of the engine enter the intake stroke after the speed of rotation of the crankshaft reaches a reference value.

In the method described in the above-identified publication, all of the intake and exhaust valves are moved from the neutral position to the fully open position at the time of a start of the engine. Subsequently, all of the intake and exhaust valves are held at the fully open position until the speed of rotation of the crankshaft reaches the reference value. Consequently, compression work to be done by the engine during cranking is reduced, and the starting period of the engine and the amount of electric power consumed by a starter motor can be reduced.

While all of the intake and exhaust valves are moved from the neutral position to the fully open position upon a start of the engine according to the known technology as described above, all of the intake and exhaust valves are not necessarily likely to reach the fully open position.

When the intake valve or exhaust valve that is likely to reach the fully closed position is moved to the fully open position, the amount of electric power consumed by the valve-opening electromagnet and/or valve-closing electromagnet is increased, or the armature may not successively displace from the neutral position to the opening-side terminal position. Consequently, it becomes difficult to appropriately start the internal combustion engine. This problem also occurs when all of the intake and exhaust valves are moved to the fully closed position at the time of a start of the engine.

SUMMARY OF THE INVENTION

It is therefore an object to provide start control method and apparatus for solenoid-operated valves of an internal combustion engine, with which the solenoid-operated valves are surely or reliably started without increasing the amount of electric power consumed by the solenoid-operated valves.

To accomplish the above object, there is provided according to a first aspect of the invention a start control apparatus for a solenoid-operated valve of an internal combustion engine, which is adapted to move an armature that is located at a neutral position, to an opening-side terminal position or a closing-side terminal position as a predetermined target position, during a starting period of the solenoid-operated valve, wherein the armature is moved to one of the opening-side terminal position and the closing-side terminal position to which the armature is more likely to be moved that the other terminal position before being moved to the predetermined target position.

For example, the start control apparatus for controlling starting of the solenoid-operated valve of the internal combustion engine determines, as a provisional target position, one of the opening-side terminal position and the closing-side terminal position which the solenoid-operated valve is more likely to reach from the neutral position, upon a start of the starting period of the solenoid-operated valve, and controls a valve-opening electromagnet or a valve-closing electromagnet so as to move the armature to the provisional target position. After the armature reaches the provisional target position, the start control apparatus moves the armature from the provisional target position to the target position. If the provisional target position is identical with the target position, however, the start control apparatus need not move the armature from the provisional target position to the target position.

When the provisional target position is not identical with the target position, the amount of exciting current required for moving the armature located at the neutral position to the provisional target position is smaller than the amount of exciting current required for moving the armature located at the neutral position to the target position. Furthermore, when the armature is moved from the provisional target position to the target position, the bias force of a corresponding elastic member acts to move the armature from the provisional target position to the target position, and therefore the armature can be moved from the provisional target position to the target position with reduced exciting current applied to the valve-opening electromagnet or the valve-closing electromagnet.

Thus, the start control apparatus of the invention is able to surely or reliably start the solenoid-operated valve without increasing an amount of electric power consumption.

The provisional target position may be determined based on a distance from the neutral position of the armature to the opening-side terminal position and a distance from the neutral position of the armature to the closing-side terminal position. This is because the amount of exciting current required for the valve-opening electromagnet or the valve-closing electromagnet to move the armature to a certain position increases as the distance of displacement of the armature increases.

The distances from the neutral position of the armature to the opening-side terminal position and the closing-side terminal position may be estimated from integrated values of the amounts of exciting current applied to the valve-opening electromagnet and the valve-closing electromagnet during an operation of the internal combustion engine, or may be estimated from the velocities of the armature when it is moved in the valve-opening direction and the valve-closing direction during an operation of the engine.

Also, the provisional target position may be determined based on the temperature of the internal combustion engine or the temperature of the solenoid-operated valve. This is because members that constitute the solenoid-operated valve expand or contract under an influence of the temperature, and the neutral position of the armature is changed in accordance with expansion or contraction of the members.

According to another aspect of the invention, the solenoid-operated valve is constructed such that the armature located at the neutral position is more likely to be moved to one of the opening-side terminal position and the closing-side terminal position than to the other terminal position, and a valve-opening electromagnet or a valve-closing electromagnet is controlled so as to move the armature to the above-indicated one terminal position during a starting period of the solenoid-operated valve.

Examples of methods of constructing the solenoid-operated valve so that the armature is more likely to be moved to one of the opening-side terminal position and the closing-side terminal position that to the other position may include, for example, (1) shifting the neutral position of the armature from the middle position toward the above-indicated one of the opening-side terminal position and the closing-side terminal position, (2) providing a protrusion on one of an opening-side surface and a closing-side surface of the armature that faces the above-indicated one of the opening-side terminal position and the closing-side terminal position, and (3) setting the magnetic permeability of one of the opening-side surface and the closing-side surface of the armature that faces the above-indicated one of the opening-side terminal position and the closing-side terminal position, to be higher than that of the other surface.

The above-indicated one of the opening-side terminal position and the closing-side terminal position may be the closing-side terminal position. This is because a period of time in which the intake valves and the exhaust valves are closed during an operation of the engine is longer than a period in which these valves are opened. For example, the intake and exhaust valves are opened only during one stroke (about 180° ) within one cycle (720° CA) of a four-stroke cycle engine. If the armature is more likely to be moved to the valve-closing side, the amount of electric power consumed for keeping the intake and exhaust valves in the closed positions can be reduced.

When the solenoid-operated valve operates to drive an exhaust valve to open and closed positions, the above-indicated one of the opening-side terminal position and the closing-side terminal position may be the opening-side terminal position. Generally, the amount of exciting current needed for opening the exhaust valve is likely to be large since the exhaust valve is opened during a period in which the pressure within the cylinder is high. If the armature is arranged to be more likely to be moved toward the opening-side terminal position, therefore, the amount of exciting current needed for opening the exhaust valve can be reduced.

Where the solenoid-operated valve is constructed according to one of the above-described methods (1) through (3), the solenoid-operated valve may be further provided with a mechanism that holds the armature at the other of the opening-side and closing-side terminal positions. In this connection, if the armature is more likely to be moved to the above-indicated one of the opening-side terminal position and the closing-side terminal position than to the other position, the amount of exciting current needed for holding the armature at the other terminal position becomes larger than the amount of exciting current needed for holding the armature at the above-indicated one terminal position. If the armature can be held at the other terminal position without utilizing electromagnetic force of the electromagnet, an otherwise possible increase in the amount of exciting current during an operation of the engine can be prevented or suppressed.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein.

DETAILED DESCRIPTION OF PREFERRED EMBODIMENTS

Some preferred embodiments of the invention will be described in detail with reference to the accompanying drawings.

First Embodiment

Figure 1:
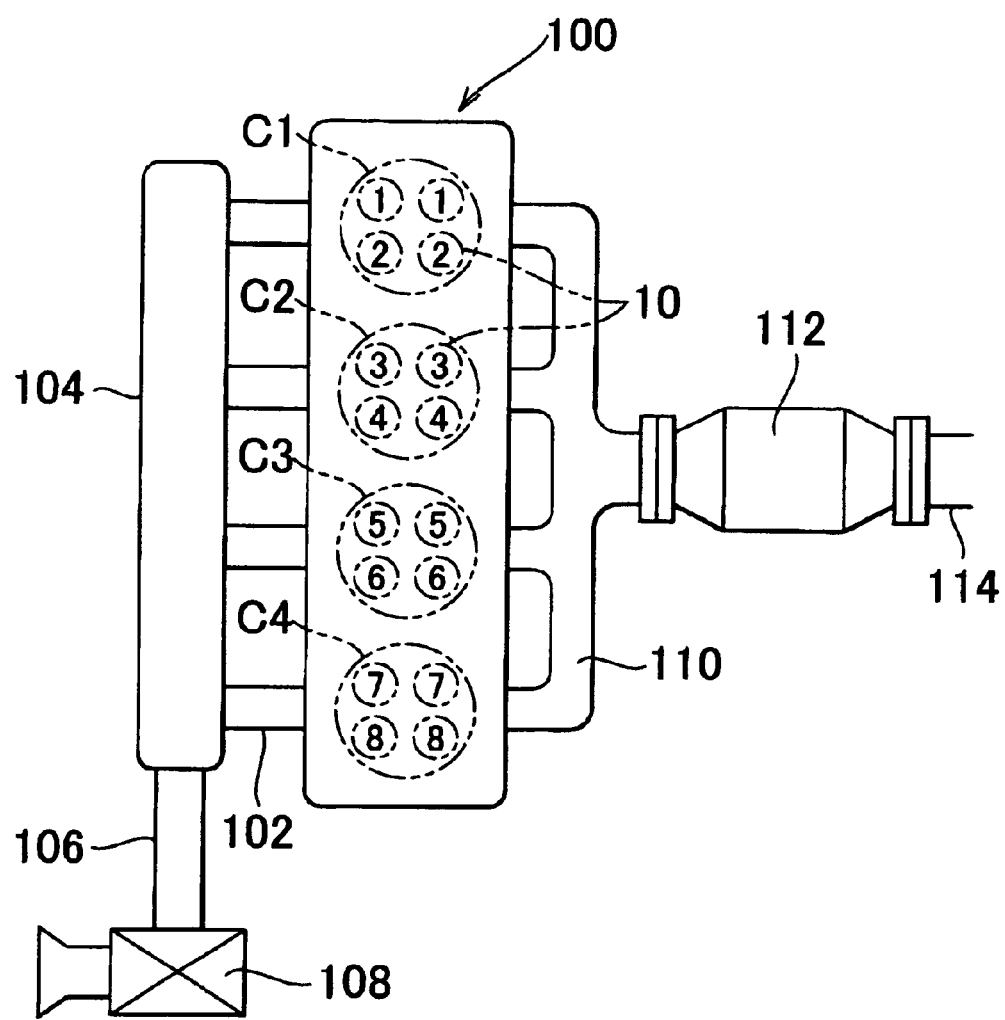
FIG. 1 is a schematic view showing a four-cylinder type internal combustion engine having a plurality of solenoid-operated valves for the respective cylinders, to which a start control method according to the invention is suitably applied.

FIG. 1 schematically shows a four-cylinder type internal combustion engine in which each cylinder is provided with a plurality of solenoid-operated valves, to which a start control method according to one embodiment of the invention is suitably applied.

Referring to FIG. 1, an internal combustion engine 100 is a four-stroke, four-cycle gasoline engine having four cylinders C1–C4. Each of the cylinders C1–C4 is provided with first and second intake ports and first and second exhaust ports. The first and second intake ports are respectively opened and closed by first and second solenoid-operated valves 10 of an intake system, and the first and second exhaust ports are respectively opened and closed by first and second solenoid-operated valves 10 of an exhaust system. Each of the intake ports is connected to an air flow meter 108 via an intake manifold 102, surge tank 104, and an intake pipe 106, and each of the exhaust ports is connected to an exhaust pipe 114 via an exhaust manifold 110 and a catalyst device 112 for purifying exhaust gases.

In FIG. 1, each solenoid-operated valve 10 is numbered such that the first and second solenoid-operated valves of the intake system for the cylinders C1–C4 are respectively referred to as intake valves No. 1–No. 8, and the first and second solenoid-operated valves of the exhaust system for the cylinders C1–C4 are respectively referred to as exhaust valves No. 1–No. 8.

Figure 2:
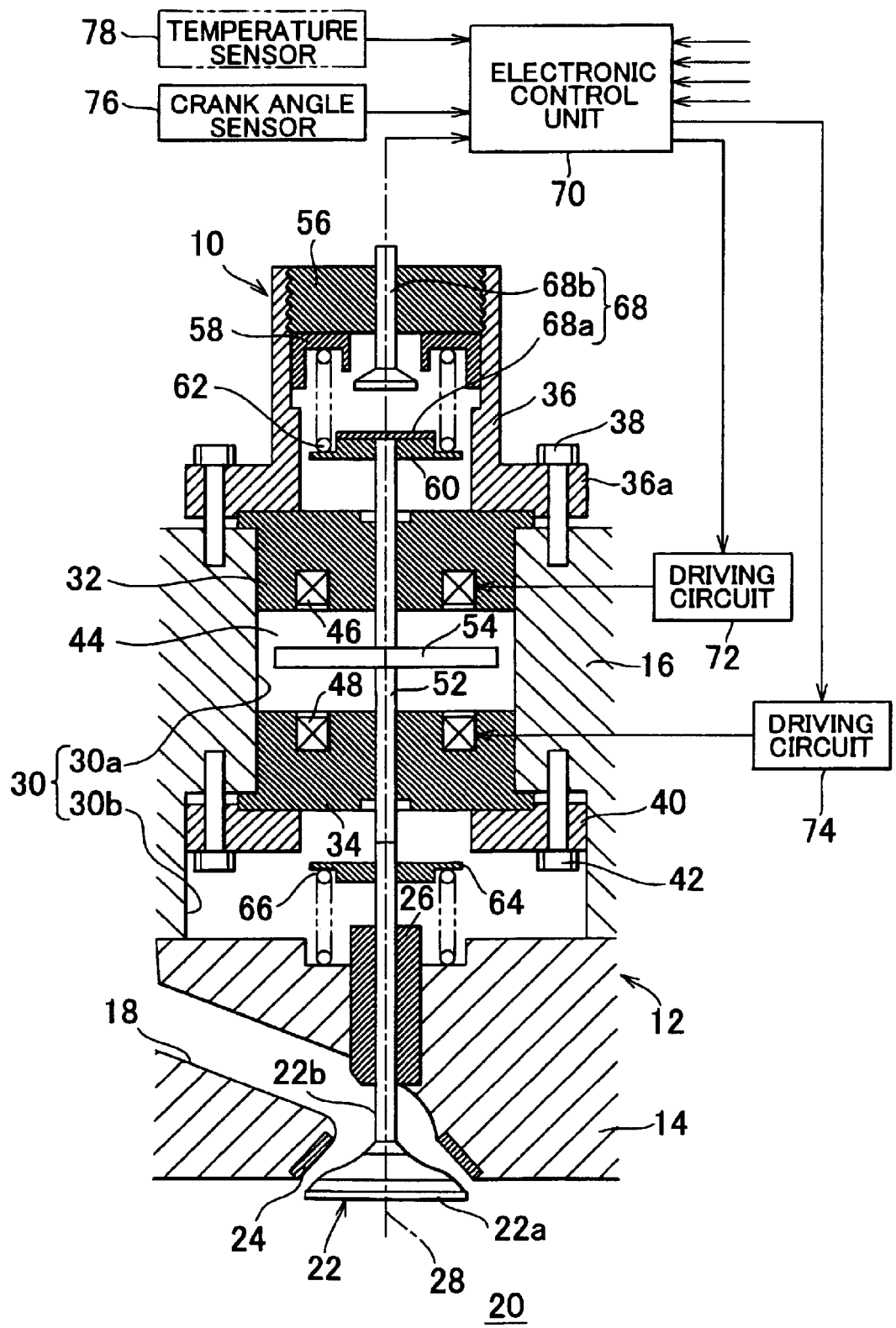
FIG. 2 is a schematic view showing one solenoid-operated valve of an intake system shown in FIG. 1.

FIG. 2 schematically shows one solenoid-operated valve of the intake system shown in FIG. 1. While the valve shown in FIG. 2 is a solenoid-operated valve of the intake system, it is to be noted that the structure of each solenoid-operated valve of the exhaust system is similar to that of the intake system. Thus, only the structure of the solenoid-operated valve of the intake system will be described herein.

Referring to FIG. 2, reference numeral 10 denotes a solenoid-operated valve mounted in a cylinder head 12. The cylinder head 12 consists of a lower head 14 fixed to an upper surface of a cylinder block (not shown), and an upper head 16 fixed to an upper surface of the lower head 14. The lower head 14 is formed with two intake ports 18 for each cylinder of the engine, and a valve seat 24 on which a valve body 22a of an intake valve 22 rests is provided at an opening end of each intake port 18 on the side of a combustion chamber 20 of the engine.

A through-hole having a circular cross section is formed through the lower head 14 such that the through-hole extends from the inner wall of each intake port 18 to the upper surface of the lower head 14 in the vertical direction as viewed in FIG. 2. A cylindrical valve guide 26 is fitted under pressure in the through hole. A stem 22b of the intake valve 22 is inserted through and supported by the valve guide 26 such that the stem 22b can reciprocate along an axis 28 indicated in FIG. 2.

The upper head 16 is formed with a core mounting hole 30 that extends in alignment with the axis 28, and the core mounting hole 30 has a small-diameter portion 30a and a large-diameter portion 30b located below the small-diameter portion 30a. An upper core 32 and a lower core 34 are disposed in the small-diameter portion 30a such that these cores 32, 34 are spaced apart from each other in the direction of the axis 28. Each of the upper core 32 and the lower core 34 is formed of a soft magnetic material, and has a substantially columnar shape. A flange is formed at the upper end of the upper core 32, and the flange abuts on the upper surface of the upper head 16. Similarly, a flange is formed at the lower end of the lower core 34, and the flange abuts on a shoulder portion formed between the small-diameter portion 30a and the large-diameter portion 30b.

An upper cap 36 having a substantially cylindrical shape is disposed above the upper core 32. A flange 36a formed at the lower end of the upper cap 36 is attached to the upper head 16 by a plurality of bolts 38 so that the upper cap 36 is fixed to the upper head 16, and the upper core 32 whose flange is sandwiched between the flange 36a and the upper head 16 is fixed to the upper head 16. A lower cap 40 having a substantially annular shape abuts on the lower surface of the lower core 34, and is fixed to the upper head 16 by a plurality of bolts 42 so that the lower core 34 whose flange is sandwiched between the lower cap 40 and the upper head 16 is fixed to the upper head 16.

The lower surface of the upper core 32 and the upper surface of the lower core 34 cooperate with the small-diameter portion 30a of the upper head 16 to define an inner space 44. Annular grooves are formed around the axis 28 in the lower surface of the upper core 32 and the upper surface of the lower core 34, and an upper electromagnetic coil 46 and a lower electromagnetic coil 48 are fitted in the respective annular grooves. The upper electromagnetic coil 46 and the lower electromagnetic coil 48 have the same diameter, and are opposed to each other via the inner space 44.

An armature stem 52 has a lower end that abuts on the upper end of the stem 22b of the intake valve 22. The armature stem 52 extends through through-holes formed in the upper core 32 and the lower core 34, and further extends upwards beyond the upper core 32 along the axis 28. The armature stem 52 is supported by the upper core 32 and the lower core 34 such that it can move up and down along the axis 28. An armature 54 formed of a soft magnetic material is fixed to the armature stem 52 within the inner space 44.

An adjuster bolt 56 is screwed in an upper end portion of the upper cap 36, and a spring seat 58 abuts on the lower surface of the adjuster bolt 56. A compression coil spring 62 is resiliently disposed between the spring seat 58 and an upper retainer 60 fixed to the upper end of the armature stem 52. The compression coil spring 62 serves to urge the intake valve 22 along the axis 28 in a valve-opening direction via the armature stem 52, namely, in a direction in which the valve body 22a moves away from the valve seat 24. A lower retainer 64 is fixed to the upper end of the stem 22b of the intake valve 22, and a compression coil spring 66 is resiliently disposed between the lower retainer 64 and the upper surface of the lower head 14. The compression coil spring 66 serves to urge the intake valve 22 upwards along the axis 28, namely, toward a closed position in which the valve body 22a rests on the valve seat 24.

The bias forces of the compression coil springs 62, 66 are set so that the position (neutral position) of the armature 54 established in a condition in which both the upper and lower electromagnetic coils 46, 48 are not energized coincides with a middle position between the lower surface of the upper core 32 and the upper surface of the lower core 34. While the neutral position may not coincide with the middle position because of the initial tolerances or chronological changes in components of the solenoid-operated valve, the neutral position may be adjusted so as to coincide with the middle position by adjusting the position of the spring seat 58 along the axis 28 by means of the adjuster bolt 56.

A disc-like target 68a is fixed to the upper surface of the upper retainer 60, and a gap sensor 68b is fixed to the adjuster bolt 56 such that its detecting end faces the target 68a. The target 68a and the gap sensor 68b cooperate with each other to provide a valve lift sensor 68, which serves as position detecting means for detecting the position of the armature 54, thereby to detect the position of the valve body 22a. The valve lift sensor 68 outputs a voltage signal indicative of a distance between the target 68a and the detecting end of the gap sensor 68b, to an electronic control unit 70 (which will be described in more detail).

The upper electromagnetic coil 46 cooperates with the upper core 32 to provide a valve-closing electromagnet. When the upper electromagnetic coil 46 is energized by exciting current supplied from a driving circuit 72, the valve-closing electromagnet (46, 32) generates electromagnetic force for attracting the armature 54 upwards in FIG. 2 against the bias force of the compression coil spring 62, so that the armature 54 moves up to a closing-side terminal position at which the armature 54 abuts on the lower surface of the upper core 32. As the armature 54 moves up to the closing-side terminal position in this manner, the intake valve 22 moves upwards in FIG. 2 under the bias force of the compression coil spring 66. The length of the stem 22b of the intake valve 22 and the length of the armature stem 52 are set so that, when the armature 54 reaches the closing-side terminal position, the valve body 22a abuts on the valve seat 24 and the intake valve 22 reaches its fully closed position.

Similarly, the lower electromagnetic coil 48 cooperates with the lower core 34 to provide a valve-opening electromagnet. When the lower electromagnetic coil 48 is energized by exciting current supplied from a driving circuit 74, the valve-opening electromagnet (48, 34) generates electromagnetic force for attracting the armature 54 downwards in FIG. 2 against the bias force of the compression coil spring 66, so that the armature 54 moves down to an opening-side terminal position at which the armature 54 abuts on the upper surface of the lower core 34. As the armature 54 moves down to the opening-side terminal position in this manner, the intake valve 22 moves downwards in FIG. 2 under the bias force of the compression coil spring 62 until it reaches its fully open position. Thus, the fully open position of the intake valve 22 is determined by the opening-side terminal position of the armature 54, the length of the armature 52, and so forth.

In order to move the intake valve 22 from the fully open position to the fully closed position, energization of the lower electromagnetic coil 48 is cancelled so that the intake valve 22 and the armature 54 move upwards in FIG. 2 due to the bias force of the compression coil spring 66 and inertia of the valve 22 and the armature 54, and the upper electromagnetic coil 46 is then energized in a stage where the armature 54 gets close to the upper core 32. As a result, the armature 54 is positioned at the closing-side terminal position, and the intake valve 22 is positioned at the fully closed position.

Conversely, in order to move the intake valve 22 from the fully closed position to the fully open position, energization of the upper electromagnetic coil 46 is cancelled so that the intake valve 22 and the armature 54 move downwards in FIG. 2 due to the bias force of the compression coil spring 62 and inertia of the valve 22 and the armature 54, and the lower electromagnetic coil 48 is then energized in a stage where the armature 54 gets close to the lower core 34. As a result, the armature 54 is positioned at the opening-side terminal position, and the intake valve 22 is positioned at the fully open position.

The electronic control unit 70 controls the driving circuits 72 and 74 thereby to control energization of the upper electromagnetic coil 46 and the lower electromagnetic coil 48, respectively. Although not illustrated in detail in FIG. 2, the electronic control unit 70 is a part of a control system that controls the internal combustion engine 100, and may be in the form of a microcomputer including CPU, ROM, RAM and input and output port devices which are connected to each other by a bi-directional common bus.

The electronic control unit 70 receives, from the valve lift sensor 68, a voltage signal corresponding to a distance between the target 68a and the detecting end of the gap sensor 68b, namely, a voltage signal indicative of the position of the armature 54. The electronic control unit 70 also receives a signal indicative of a crank angle θc of the internal combustion engine 100, from a crank angle sensor 76, and a signal indicative of a temperature Te, such as a coolant temperature, of the engine 100, from a temperature sensor 78, and receives other signals required for controlling the engine 100, though corresponding sensors are not illustrated in FIG. 2. The electronic control unit 70 is adapted to perform start control and normal control of each solenoid-operated valve 10, according to a flowchart shown in FIG. 3, at the time of a start of the engine and during a normal operation of the engine.

In particular, the ROM of the electronic control unit 70 of this embodiment stores a map of provisional target positions of the armature 54 that are determined in advance with respect to the intake valves No. 1–No. 8 and the exhaust valves No. 1–No. 8, as indicated in TABLE 1 below. The ROM also stores energization patterns A, B (refer to FIG. 4 and FIG. 5) for the upper electromagnetic coil 46 and the lower electromagnetic coil 48 during a starting period of the solenoid-operated valve in question in the cases where the provisional target position is present in the valve-opening direction and in the valve-closing direction, respectively. The ROM further stores target positions of the armature 54 at the time of completion of the starting period of the solenoid-operated valve, which positions are set in advance with respect to the intake valves No. 1–No. 8 and the exhaust valves No. 1–No. 8.

TABLE 1

| Valve No. | 1 | 2 | 3 | 4 | ... | 8 |
|---|---|---|---|---|---|---|
| Intake Valve | Open | Open | Closed | Open | ... | Open |
| Exhaust Valve | Open | Open | Open | Open | ... | Open |

Figure 3:
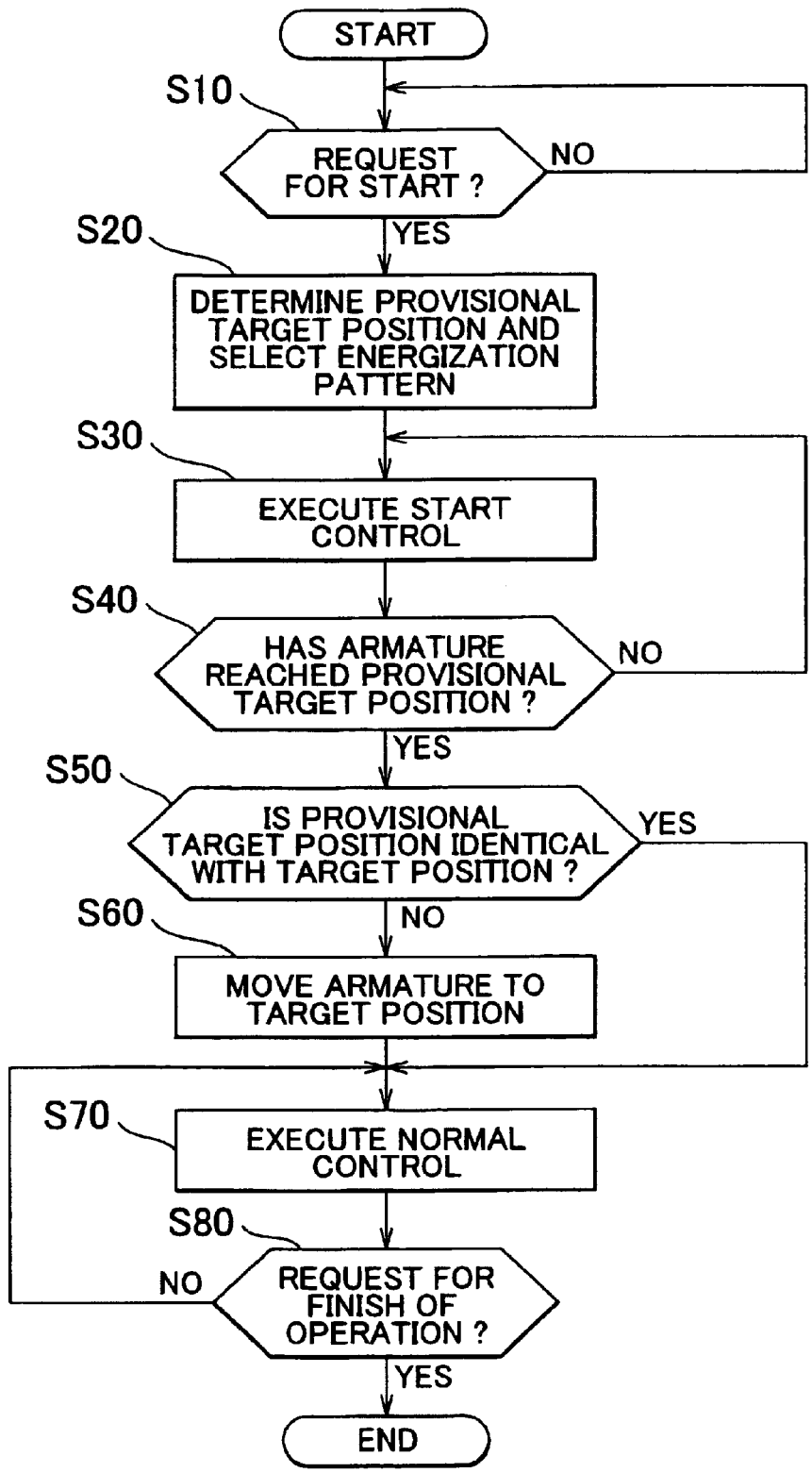
FIG. 3 is a flowchart showing a routine of start control and normal control of the solenoid-operated valves according to the first embodiment of the invention.
Figure 4:
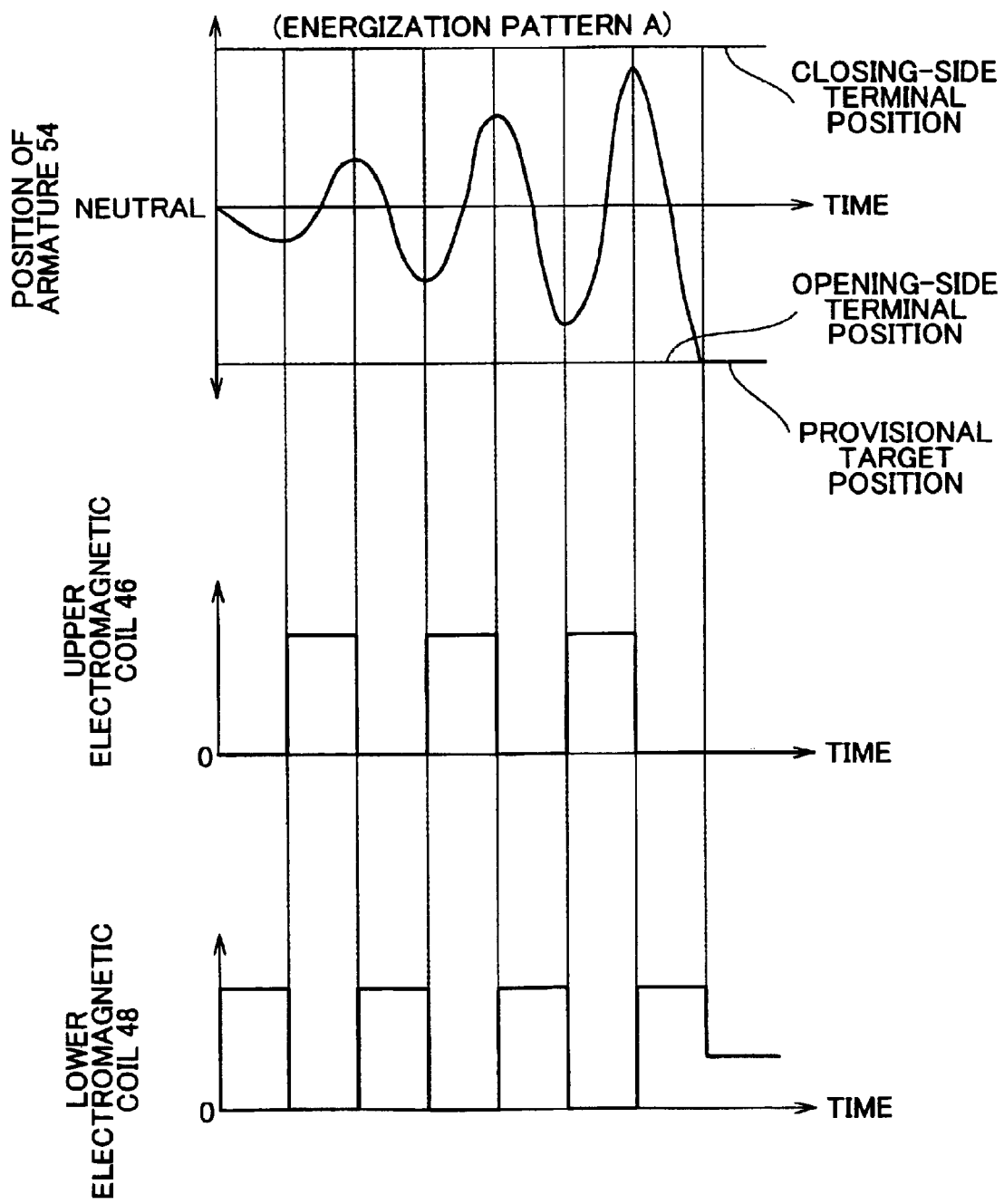
FIG. 4 is a graph showing an energization pattern A for an upper electromagnetic coil and a lower electromagnetic coil when a provisional target position is an opening-side terminal position.
Figure 5:
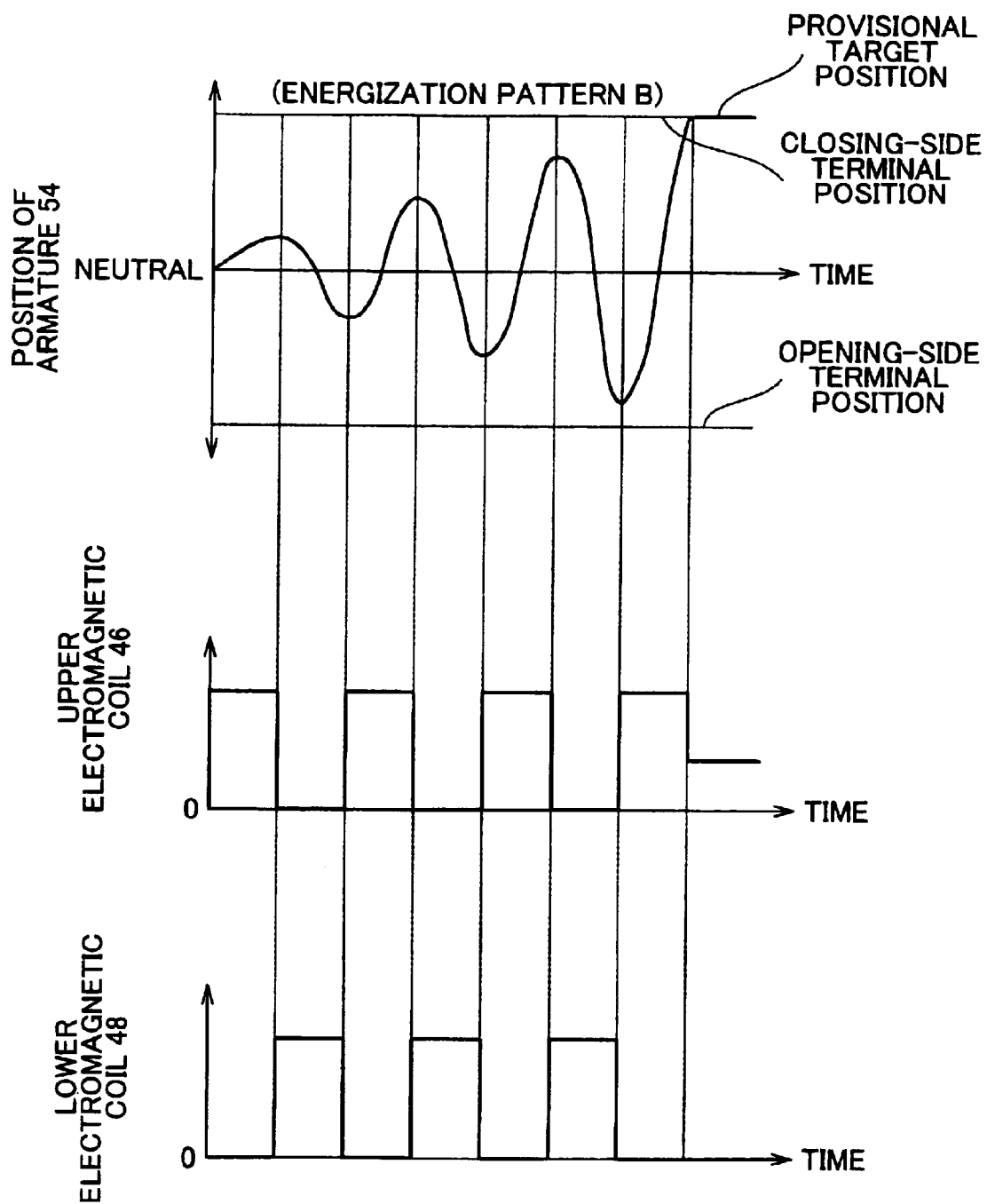
FIG. 5 is a graph showing an energization pattern B for the upper electromagnetic coil and the lower electromagnetic coil when the provisional target position is a closing-side terminal position.

As will be described in detail later, the electronic control unit 70 determines the provisional target position of the armature 54 with respect to each of the intake valves No. 1–No. 8 and the exhaust valves No. 1–No. 8 upon a start of the engine 100, referring to the map of TABLE 1. The control unit 70 then determines the energization patterns for the upper electromagnetic coil 46 and the lower electromagnetic coil 48 based on the result of the determination (i.e., the determined provisional target position), and energizes the upper electromagnetic coil 46 and the lower electromagnetic coil 48 in accordance with the determined energization pattern, so as to start each solenoid-operated valve 10. In the example of FIG. 3 and FIG. 4, the energization pattern A is selected when the provisional target position is the opening-side terminal position, and the energization pattern B is selected when the provisional target position is the closing-side terminal position.

The electromagnetic force required for driving the armature 54 increases with an increase in the distance between the upper electromagnetic coil 46 or the lower electromagnetic coil 48 and the armature 54. When an operation of the engine is started, the armature 54 is located at the neutral position, and the above distance is large. In either of the energization patterns A, B, therefore, the armature 54 is initially driven a slight distance toward the opening-side terminal position or the closing-side terminal position upon a start of the solenoid-operated valve 10, and the upper electromagnetic coil 46 and the lower electromagnetic coil 48 are alternately energized so as to gradually increase strokes of the armature 54 along the axis 28.

Next, the start control and normal control of the solenoid-operated valve 10 according to the first embodiment of the invention will be described with reference to the flowchart as shown in FIG. 3. The control according to the flowchart shown in FIG. 3 is initiated when an ignition switch (not shown) is switched from an OFF state to an ON state, and each step of steps S20–S80 is executed in a predetermined order with respect to all solenoid-operated valves, i.e., the intake valves No. 1–No. 8 and the exhaust valves No. 1–No. 8.

Initially, it is determined in step S10 whether a request for a start of the solenoid-operated valves 10 is generated in an engine control routine that is not illustrated. If a negative determination is made, step S10 is repeatedly executed. If an affirmative determination is made, step S20 is executed to determine the provisional target position of the armature 54 of the solenoid-operated valve 10 in question based on TABLE 1, and select the energization pattern A or B for the upper electromagnetic coil 46 and the lower electromagnetic coil 48 depending upon the determined provisional target position.

In step S30, the start control of the solenoid-operated valve 10 is executed by alternately energizing the upper electromagnetic coil 46 and the lower electromagnetic coil 48 according to the selected energization pattern A or B, such that the movement of the intake valve 22 (or the exhaust valve) and the armature 54 is initiated toward the determined provisional target position, and the reciprocation strokes of the intake valve 22 and armature 54 are progressively increased.

In step S40, it is determined whether the armature 54 has reached the provisional target position, which is the opening-side terminal position when the energization pattern A is selected, and is the closing-side terminal position when the energization pattern B is selected. If a negative determination is made in step S40, the control process returns to step S30. If an affirmative determination is made, the control process proceeds to step S50.

In step S50, it is determined whether the provisional target position is identical with the target position that is set in advance with respect to the solenoid-operated valve 10 in question. If an affirmative determination is made in step S50, the control process proceeds to step S70. If a negative determination is made, the upper electromagnetic coil 46 or the lower electromagnetic coil 48 is energized in step S60 so that the armature 54 is moved to the target position of the solenoid-operated valve 10 in question, and then the control process proceeds to step S70. Here, the target position of each solenoid-operated valve may be arbitrarily determined. For example, the target position of the intake valves may be the fully closed position, and the target position of the exhaust valves may be the fully open position.

In step S70, normal control of each solenoid-operated valve 10 is performed in a manner known in the art. More specifically, the position and the velocity of the armature 54 of the solenoid-operated valve 10 is controlled in a feedback fashion based on the result of detection of the valve lift sensor 68, so that the position and the velocity of the armature 54 repeatedly change between the closing-side terminal position and the opening-side terminal position in synchronism with changes in the crank angle θc detected by the crank angle sensor 76, according to a target phase plane of FIG. 6 indicating a target position and a target velocity during normal control. With the armature 54 thus moved, the valve body 22*a* is alternately moved toward and held at the fully closed position and the fully open position, while at the same time the opening and closing timing is controlled according to the operating conditions of the internal combustion engine 100.

In step S80, it is determined whether a request for termination of the operation of the solenoid-operated valve 10 in question is generated in the engine control routine (not shown). If a negative determination is made, the control process returns to step S70. If an affirmative determination is made, energization of the upper electromagnetic coil 46 and the lower electromagnetic coil 48 is stopped, and the control according to the routine shown in FIG. 3 is finished.

Generally, the neutral position of the armature 54 is defined as a position at which the bias forces of the compression coil springs 62 and 66 are balanced with each other, which position is normally a middle position between the opening-side terminal position and the closing-side terminal position. However, the relationship between the opening-side and closing-side terminal positions and the neutral position varies from one solenoid-operated valve to another owing to variations or mounting tolerances in the components of the individual solenoid-operated valves 10. Accordingly, the provisional target position of the armature 54 varies from one solenoid-operated valve to another. It is also to be noted that the exhaust valve is more likely to be closed and less likely to be opened because it receives force of exhaust gas that flows from the corresponding combustion chamber toward the exhaust port. In view of these operating characteristics, the neutral position may be shifted toward the opening-side terminal position by means of the adjuster screw 56.

According to the first embodiment as described above, when a request for a start of the solenoid-operated valve 10 is generated, the provisional target position of the armature 54 of the solenoid-operated valve 10 in question is determined in step S20 based on TABLE 1, and the energization pattern A or B for the upper electromagnetic coil 46 and the lower electromagnetic coil 48 is selected according to the determined provisional target pattern. Then, the upper electromagnetic coil 46 and the lower electromagnetic coil 48 are alternately energized in accordance with the selected energization pattern A or B in step S30, such that the movement of the valve body 22a and the armature 54 is started and their reciprocation strokes are progressively increased. Thus, the start control of each solenoid-operated valve 10 is performed so that the armature 54 moves to the determined provisional target position.

Accordingly, even if the provisional target position of the armature 54 varies from one solenoid-operated valve to another in view of variations or mounting tolerances in the components of the individual solenoid-operated valves 10, the armature 54 of each solenoid-operated valve 10 can be surely moved to the provisional target position upon a start of the solenoid-operated valve 10. Thus, the respective solenoid-operated valves can be started with higher reliability as compared with the case where the armatures of all of the solenoid-operated valves are uniformly moved to the opening-side terminal positions or the closing-side terminal positions. Furthermore, exciting current required for starting the solenoid-operated valves can be advantageously reduced.

In the first embodiment, the armature 54 is moved to the provisional target position according to the energization pattern A or B, and if step S50 determines that the provisional target position is different from the target position of the solenoid-operated valve 10 in question, the armature 54 is moved to the target position in step S60. With this control, the armature 54 of each solenoid-operated valve 10 can be surely moved to the target position.

Figure 22:
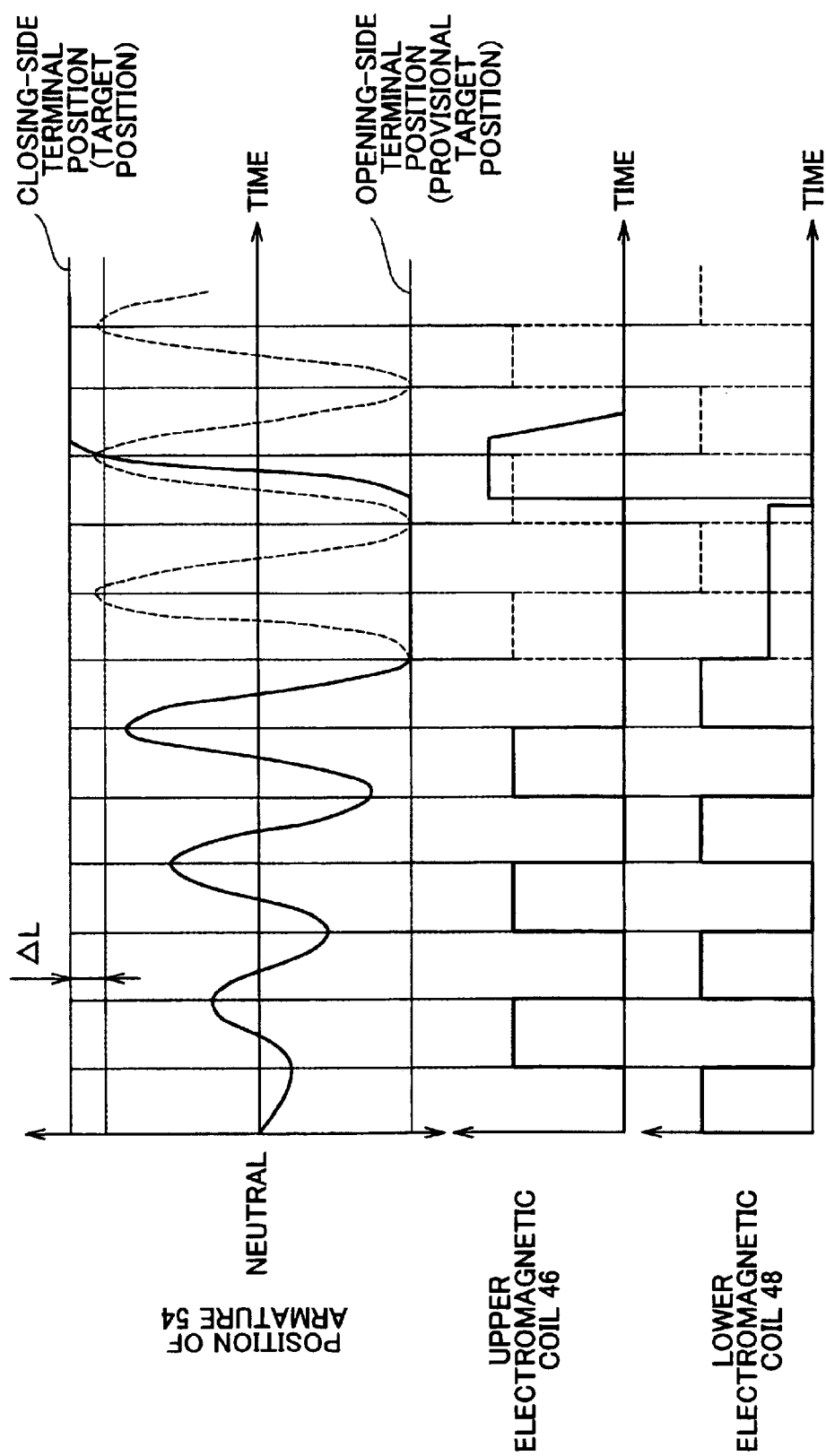
FIG. 22 is a graph indicating starting conditions of a solenoid-operated valve in a conventional control apparatus and in the first embodiment, when the target position of an armature during a start of the solenoid-operated valve is a closing-side terminal position, and the neutral position of the armature deviates by ΔL toward an opening-side terminal position, while the provisional target position is the opening-side terminal position.

For example, FIG. 22 illustrates a situation at the time of a start of a certain solenoid-operated valve 10 in which the target position of the armature 54 upon its start is the closing-side terminal position, and the neutral position of the armature deviates by ΔL toward the opening-side terminal position, while the provisional target position is the opening-side terminal position. In the case of a conventional control apparatus, the upper electromagnetic coil 46 and the lower electromagnetic coil 48 are alternately energized so that the armature 54 reaches the opening-side terminal position at a point of time t1, but the armature 54 cannot be moved to the closing-side terminal position as the target position, as indicated by a broken line in FIG. 22, due to a limit to the energy given to the armature 54, even if the upper electromagnetic coil 46 and the lower electromagnetic coil 48 are kept alternately energized after time t1. In this case, the amount of electric power consumption is increased, and the solenoid-operated valve may not be started as desired.

According to the first embodiment, on the other hand, the armature 54 reaches the opening-side terminal position as the provisional target position at time t1, and is then held at the opening-side terminal position through energization of the lower electromagnetic coil 48, for example, during a period between time t1 and time t2. Subsequently, the upper electromagnetic coil 46 is energized at time t3 so that the armature 54 can be surely moved to the closing-side terminal position as the target position. In this manner, the solenoid-operated valve 10 can be reliably started with a reduced amount of electric power consumption. Here, time t2 may be at the same point as time t3.

In the first embodiment, in particular, the start control of the solenoid-operated valve 10 is performed such that the movement of the armature 54 is initiated in a direction toward the provisional target position, and the reciprocation stroke of the armature 54 progressively increases until the armature 54 reaches the provisional target position. With this arrangement, exciting current required for starting the solenoid-operated valve 10 can be reduced, as compared with the case where armature 54 is moved from the neutral position directly toward the provisional target position by using large exciting current, and vibration noise during starting of the valve 10 can be reduced. These effects can be similarly obtained in the other embodiments as follows.

Second Embodiment

In the second embodiment, the electronic control unit 70 receives a temperature Te, such as a coolant temperature, of the internal combustion engine 100 from the temperature sensor 78 indicated by a two-dot chain line in FIG. 2, in addition to the voltage signal indicative of the position of the armature 54 from the valve lift sensor 68, and the signal indicative of the crank angle θc from the crank angle sensor 76.

In the second embodiment, the ROM of the electronic control unit 70 stores a map as shown in TABLE 2 below indicating the relationship between the temperature Te of the engine 100 and the provisional target position of the armature 54, which relationship is obtained in advance with respect to the intake valves No. 1–No. 8 and the exhaust valves No. 1–No. 8, in addition to the energization patterns A, B used during starting of each solenoid-operated valve 10 for the upper electromagnetic coil 46 and the lower electromagnetic coil 48

TABLE 2

| | Temperature Te (° C.) | | | | | |
|---|---|---|---|---|---|---|
| | −40 | −20 | 0 | 20 | ... | 120 |
| Intake Valve No. 1 | Open | Open | Closed | Closed | ... | Closed |
| Intake Valve No. 2 | Open | Open | Closed | Closed | ... | Closed |
| ... | ... | ... | ... | ... | | ... |
| Intake Valve No. 8 | Open | Open | Closed | Closed | ... | Closed |
| Exhaust Valve No. 1 | Open | Open | Open | Closed | ... | Closed |
| Exhaust Valve No. 2 | Open | Open | Open | Open | ... | Closed |
| ... | ... | ... | ... | ... | | ... |
| Exhaust Valve No. 8 | Open | Open | Open | Open | ... | Closed |

Figure 7:
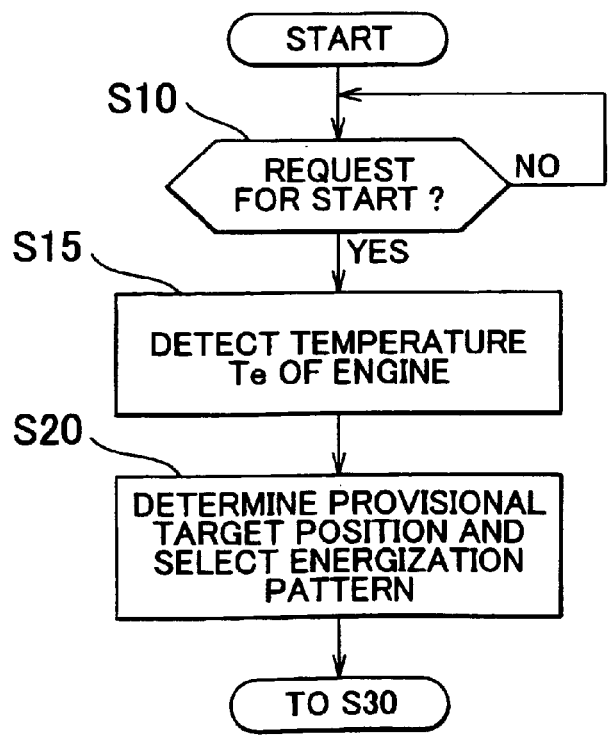
FIG. 7 is a flowchart showing a principal part of a routine of start control and normal control of solenoid-operated valves according to a second embodiment of the invention.

The electronic control unit 70 performs start control and normal control of each solenoid-operated valve 10 according to the flowchart shown in FIG. 7 during starting and normal operations of the internal combustion engine 100. In FIG. 7, the same step numbers as used in FIG. 3 are used for identifying the same steps as those shown in FIG. 3. While FIG. 7 illustrates only a part of the start control and normal control routine of the solenoid-operated valves 10, it is to be understood that step S15 and subsequent steps are executed with respect to each solenoid-operated valve 10, and that step S30 and subsequent steps are executed in the same manner as in the case of the above-described first embodiment.

As shown in FIG. 7, in the second embodiment, if an affirmative determination is made in step S10, the temperature Te of the engine 100 is detected by the temperature sensor 78 in step S15, and step S20 is executed to determine the provisional target position of the armature 54 of the solenoid-operated valve 10 in question based on the temperature Te of the engine 100 and the map of TABLE 2 as indicated above, and select the energization pattern A or B for the upper electromagnetic coil 46 and the lower electromagnetic coil 48 depending upon the determined provisional target position.

In this case, when the detected temperature Te of the engine 100 is an intermediate value of two adjacent temperatures indicated in TABLE 2, the provisional target position of the armature 54 is determined based on one of the two adjacent temperatures in TABLE 2 to which the current temperature Te is closer. This also applies to the other embodiments as described later.

Generally, the neutral position of the armature 54 is set to the middle position between the opening-side terminal position and the closing-side terminal position when the engine 100 is in an ordinary temperature condition. Even in this case, if the temperature of the engine 100 increases and the upper cap 36 thermally expands by a larger amount than the other members, the adjuster screw 56 moves upwards as viewed in FIG. 2, and the neutral position of the armature 54 shifts from the middle position to the valve-closing side. Conversely, if the temperature of the engine 100 decreases, and the upper cap 36 thermally contracts by a larger amount than the other members, the adjuster screw 56 moves downwards as viewed in FIG. 2, and the neutral position of the armature 54 shifts from the middle position to the valve-opening side. Accordingly, the provisional target position of the armature 54 of each solenoid-operated valve 10 changes depending upon the temperature of the engine 100.

According to the second embodiment as described above, the temperature Te of the engine 100 is detected by the temperature sensor 78 in step S15, and the provisional target position of the armature 54 of each solenoid-operated valve 10 is determined in step S20 based on the temperature Te of the engine 100 and the map of TABLE 2. Thus, the provisional target position can be appropriately determined in accordance with the actual changes in the provisional target position due to changes in the temperature of the engine 100.

Third Embodiment

In the third embodiment of the invention, the microcomputer of the electronic control unit 70 includes a backup RAM as a non-volatile memory in addition to the CPU, ROM, RAM and input and output port devices. The map of TABLE 2 is stored in the backup RAM instead of the ROM.

Figure 8:
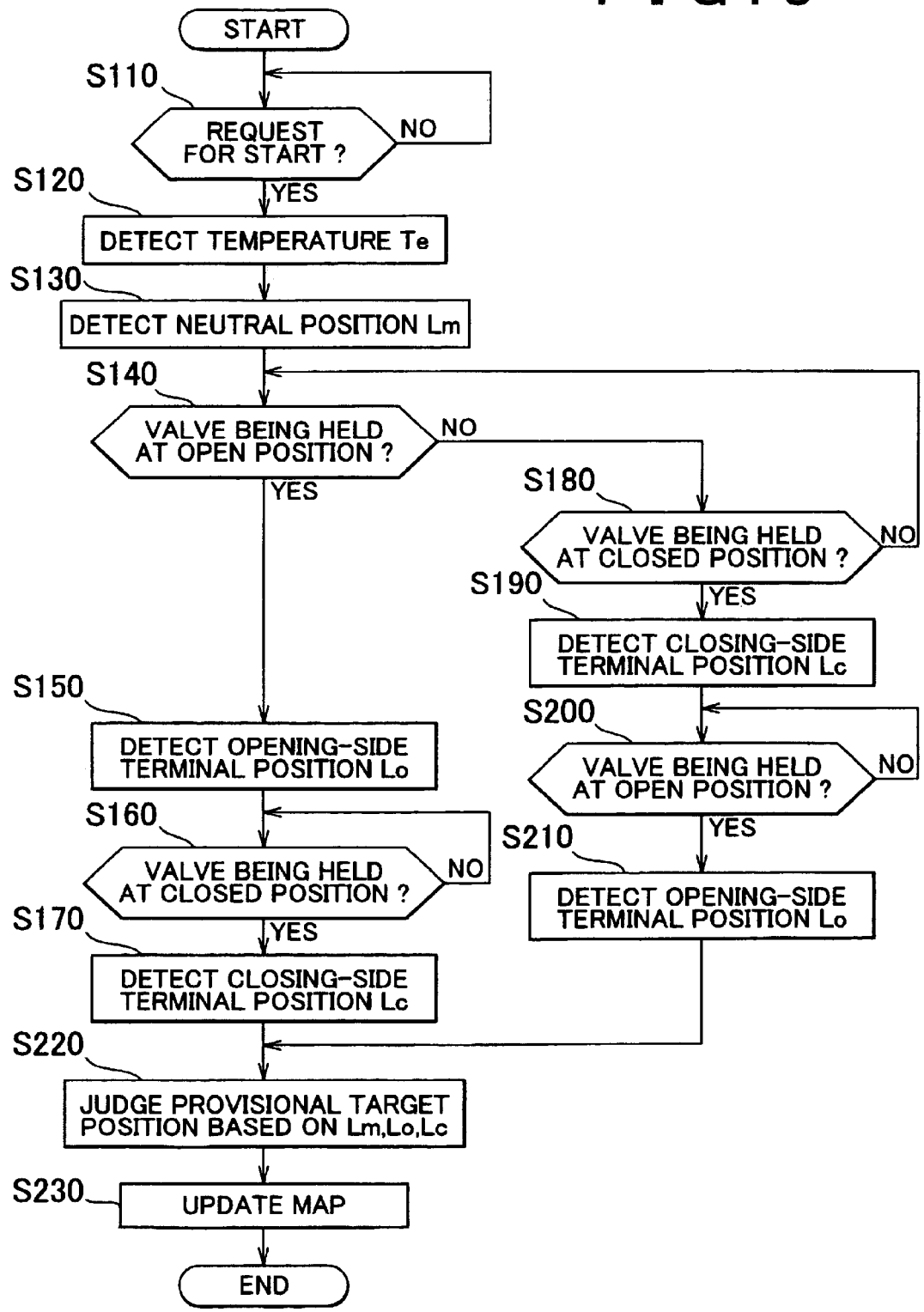
FIG. 8 is a flowchart showing a control routine for judging a provisional target position according to a third embodiment of the invention.

While the start control and normal control of the solenoid-operated valves are performed in the third embodiment in a similar manner to the above-described second embodiment, the map of TABLE 2 used for determining the provisional target position of the armature 54 is updated according to a control routine shown in FIG. 8. The control according to the flowchart shown in FIG. 8 is started when the ignition switch (not shown) is switched from OFF to ON, and each of step S120 and subsequent steps is executed in a preset order with respect to all of the solenoid-operated valves, i.e., the intake valves No. 1–No. 8 and the exhaust valves No. 1–No. 8.

Initially, it is determined in step S110 whether a request for a start of the solenoid-operated valves 10 is generated in an engine control routine (not shown). If a negative determination is made, step S110 is repeatedly executed. If an affirmative determination is made, the temperature Te of the engine 100 is detected by the temperature sensor 78 in step S120.

In step S130, the position L (i.e., neutral position Lm) of the armature 54 of the solenoid-operated valve 10 in question is calculated according to the following expression (1), based on an output voltage Va of the valve lift sensor 68. In the expression (1), Vaos, Vams and Vacs represent standard output voltages of the valve lift sensor 68 detected when the armature 54 is located at the opening-side terminal position, the neutral position, and the closing-side terminal position, respectively. Also, in the expression (1), Los represents a standard moving distance of the armature 54 between the opening-side terminal position and the closing-side terminal position, and Vaos, Vams, Vacs and Los are set, for example, at the time of delivery or shipping of the vehicle.

$$L = Los(Va-Vaos)/(Vacs-Vaos) \quad (1)$$

In step S140, it is determined whether the solenoid-operated valve 10 is being held in the open position, namely, whether the armature 54 is kept in contact with the lower core 34. If a negative determination is made in step S140, the control process proceeds to step S180. If an affirmative determination is made in step S140, the position L (the opening-side terminal position Lo) of the armature 54 is calculated in step S150 according to the above expression (1), based on the output voltage Va of the valve lift sensor 68.

In step S160, it is determined whether the solenoid-operated valve 10 in question is being held in the closed position, namely, whether the armature 54 is kept in contact with the upper core 32. If a negative determination is made, step S160 is repeatedly executed. If an affirmative determination is made, the position L (the closing-side terminal position Lc) of the armature 54 is calculated in step S170 according to the above expression (1), based on the output voltage Va of the valve lift sensor 68.

Similarly, it is determined in step S180 whether the solenoid-operated valve 10 in question is being held in the closed position. If a negative determination is made in step S180, the control process returns to step S140. If an affirmative determination is made in step S180, the position L (closing-side terminal position Lc) of the armature 54 is calculated in step S190 according to the above expression (1), based on the output voltage Va of the valve lift sensor 68.

In step S200, it is determined whether the solenoid-operated valve 10 in question is being held in the open position. If a negative determination is made, step S200 is repeatedly executed. If an affirmative determination is made, the position L (opening-side terminal position Lo) of the armature 54 is calculated in step S210 according to the above expression (1), based on the output voltage Va of the valve lift sensor 68.

In step S220, the provisional target position of the armature 54 is judged based on the middle position Lm, the opening-side terminal position Lo and the closing-side terminal position Lc. In step S230, the map corresponding to TABLE 2 is updated as needed, based on the temperature Te of the engine 100 and the result of judgment in step S220.

For example, in step S220, one of the terminal positions whose difference in position from the middle position (i.e., Lm–Lo or Lc–Lm) is smaller than that of the other position is judged as the provisional target position of the armature 54. In step S230, when the temperature Te of the engine 100 is equal to or larger than Tx–$\alpha$ and equal to or smaller than Tx+$\alpha$ where Tx represents a temperature, such as –20° C., as shown in TABLE 2 and $\alpha$ represents a positive constant, the provisional target position with respect to the temperature Tx in FIG. 2 is rewritten to be updated as needed.

Generally, the provisional target position of the armature 54 changes depending upon not only the temperature of the engine 100, but also chronological changes of each solenoid-operated valve 10. For example, if the compression coil spring 62 is fatigued, the neutral position shifts to the valve-closing side, and the provisional target position of the armature 54 may be changed to the closing-side terminal position. If the compression coil spring 66 is fatigued, to the contrary, the neutral position shifts to the valve-opening side, and the provisional target position of the armature 54 may be changed to the opening-side terminal position. Also, if the valve seat wears, the amount of compression of the compression coil spring 66 is reduced, and therefore the solenoid-operated valve 10 is more likely to be opened.

In the third embodiment as described above, the temperature Te of the engine 100 and the neutral position Lm of the armature 54 are detected in steps S120 and S130 when the operation of the engine 100 is started. In steps S140 through S210, the opening-side terminal position Lo of the armature 54 is detected when each solenoid-operated valve 10 is held in the open state for the first time during the operation of the engine 100, and the closing-side terminal position Lc of the armature 54 is detected when the solenoid-operated valve 10 is held in the closed state for the first time. Then, the provisional target position of the armature 54 is judged based on these positions Lm, Lo, Lc in step S220, and the map of TABLE 2 is updated in step S230.

Since the map of TABLE 2 is rewritten in accordance with chronological changes in the engine 100 and the solenoid-operated valves 10, the map can be suitably arranged to match the actual conditions of the engine 100 and the solenoid-operated valves 10, as compared with the first and second embodiments in which the provisional target positions are fixed. Thus, each solenoid-operated valve 10 can be surely and appropriately started even in the presence of chronological changes, such as wear of the valve seat and fatigue of the compression coil springs.

In the third embodiment, in particular, the temperature Te of the engine 100, the neutral position Lm, opening-side terminal position Lo and the closing-side terminal position Lc of the armature 54 are calculated as values at the time of a start of the operation of the engine 100, namely, these values are detected before the temperature of the engine 100 is elevated due to combustion. Thus, the provisional target position of the armature 54 for use during a cold start of the engine can be appropriately determined, and therefore each solenoid-operated valve 10 can be surely and appropriately started during the cold start of the engine.

Fourth Embodiment

Figure 9:
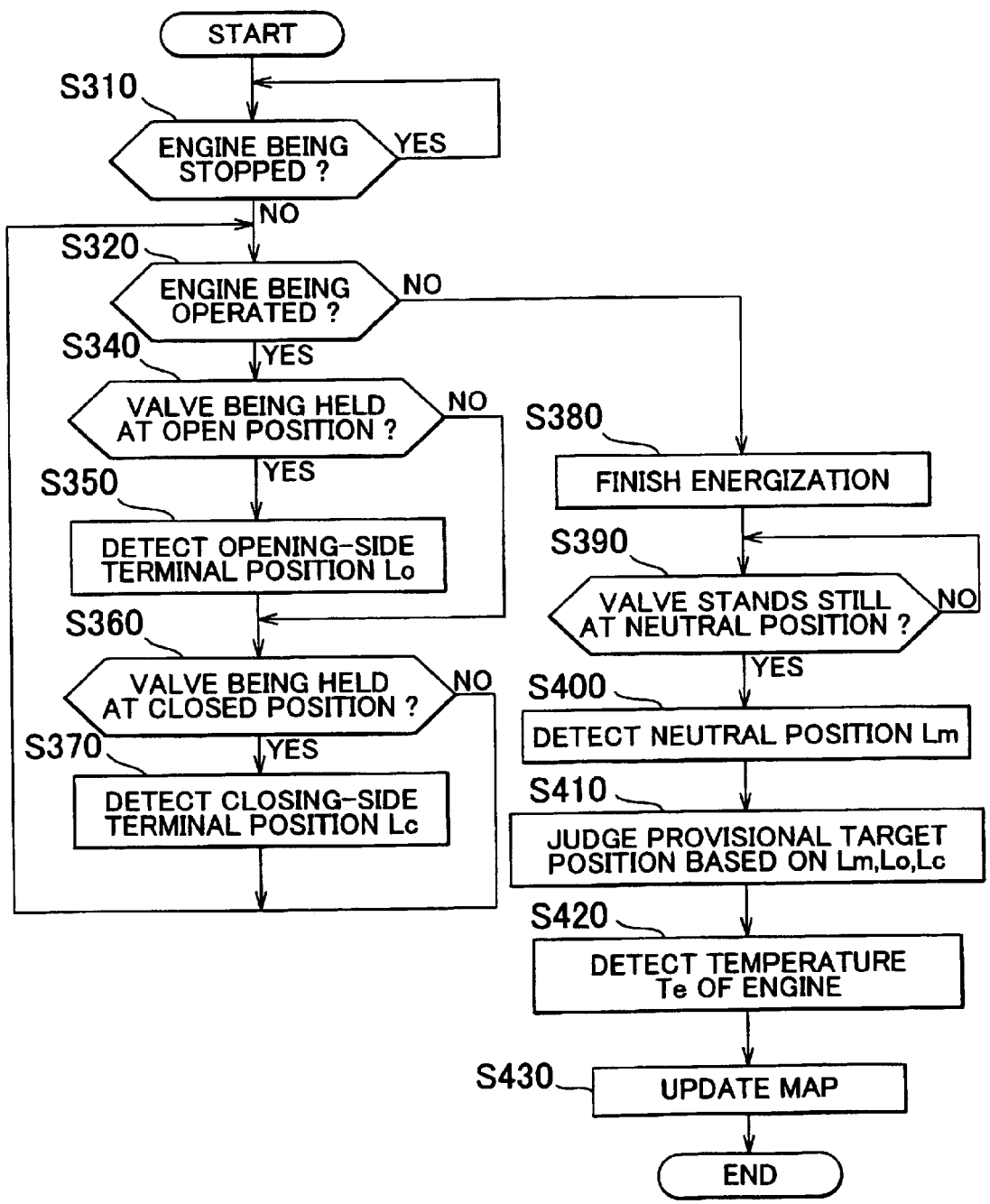
FIG. 9 is a flowchart showing a control routine for judging a provisional target position according to a fourth embodiment of the invention.

While the start control and normal control of the solenoid-operated valves are performed in the fourth embodiment in a similar manner to the above-described second embodiment, the map of TABLE 2 used for determining the provisional target position of the armature 54 is updated according to a control routine shown in FIG. 9. The control according to the flowchart shown in FIG. 9 is started when the ignition switch (not shown) is switched from OFF to ON, and each of step S320 and subsequent steps is executed in a preset order with respect to all of the solenoid-operated valves, i.e., the intake valves No. 1–No. 8 and the exhaust valves No. 1–No. 8.

Initially, it is determined in step S310 whether the internal combustion engine 100 is being stopped. If an affirmative determination is made, step S310 is repeatedly executed. If a negative determination is made, the control process proceeds to step S320. In step S320, it is determined whether the engine 100 is in operation. If a negative determination is made, the control process proceeds to step S380. If an affirmative determination is made in step S320, the control process proceeds to step S340.

In step S340, it is determined whether the solenoid-operated valve 10 in question is being held in the open position. If a negative determination is made in step S340, the control process proceeds to step S360. If an affirmative determination is made in step S340, the opening-side terminal position Lo of the armature 54 of the solenoid-operated valve 10 in question is detected in step S350.

In step S360, it is determined whether the solenoid-operated valve 10 in question is being held in the closed position. If a negative determination is made in step S360, the control process returns to step S320. If an affirmative determination is made in step S360, the closing-side terminal position Lc of the armature 54 of the solenoid-operated valve 10 in question is detected in step S370, and the control process then returns to step S320.

In step S380, energization of the upper electromagnetic coil 46 and the lower electromagnetic coil 48 is finished, and it is determined in step S390 whether the armature 54 stands still at the neutral position. If a negative determination is made, step S390 is repeatedly executed. If an affirmative determination is made, the neutral position Lm of the armature 54 is detected in step S400.

In step S410, the provisional target position of the armature 54 of the solenoid-operated valve 10 in question is judged based on the neutral position Lm, opening-side terminal position Lo and the closing-side terminal position Lc of the armature 54. In this case, too, one of the opening-side terminal position Lo and the closing-side terminal position Lc, whose difference in position from the neutral position Lm is smaller than that of the other position, is judged as the provisional target position.

In step S420, the temperature Te of the engine 100 is detected by the temperature sensor 78, and the map of TABLE 2 is updated in step S430 in the same manner as in step S230, based on the provisional target position determined in step S410 and the temperature Te of the engine 100 detected in step S420.

According to the fourth embodiment as described above, the opening-side terminal position Lo and closing-side terminal position Lc of the armature 54 are repeatedly detected in steps S340 through S370 during an operation of the engine 100, whereby the opening-side terminal position Lo and closing-side terminal position Lc of the armature 54 at the time when the operation of the engine 100 is finished are finally detected. Also, the neutral position Lm of the armature 54 is detected in step S400 in a stage where the armature 54 stands still at the neutral position when the operation of the engine 100 is finished, and the temperature Te of the engine 100 is detected in step S420. The provisional target position of the armature 54 is judged based on these positions Lm, Lo and Lc in step S410, and the map of TABLE 2 is updated as needed in step S430.

Since the map of TABLE 2 is rewritten in accordance with chronological changes in the engine 100 and the solenoid-operated valves 10, the map is suitably arranged to match the actual conditions of the engine 100 and the solenoid-operated valves 10, as in the case of the above-described third embodiment. Thus, each solenoid-operated valve 10 can be surely and appropriately started even in the presence of chronological changes, such as wear of the valve seat and fatigue of the compression coil springs.

In the fourth embodiment, in particular, the temperature Te of the engine 100, the neutral position Lm, opening-side terminal position Lo and the closing-side terminal position Lc of the armature 54 are calculated as values at the time when the operation of the engine 100 is finished, namely, these values are detected after the temperature of the engine is elevated due to combustion. Thus, the provisional target position of the armature 54 for use during a warm re-start of the engine can be appropriately determined, and therefore each solenoid-operated valve 10 can be surely and appropriately started during the warm re-start start of the engine.

Fifth Embodiment

Figure 10:
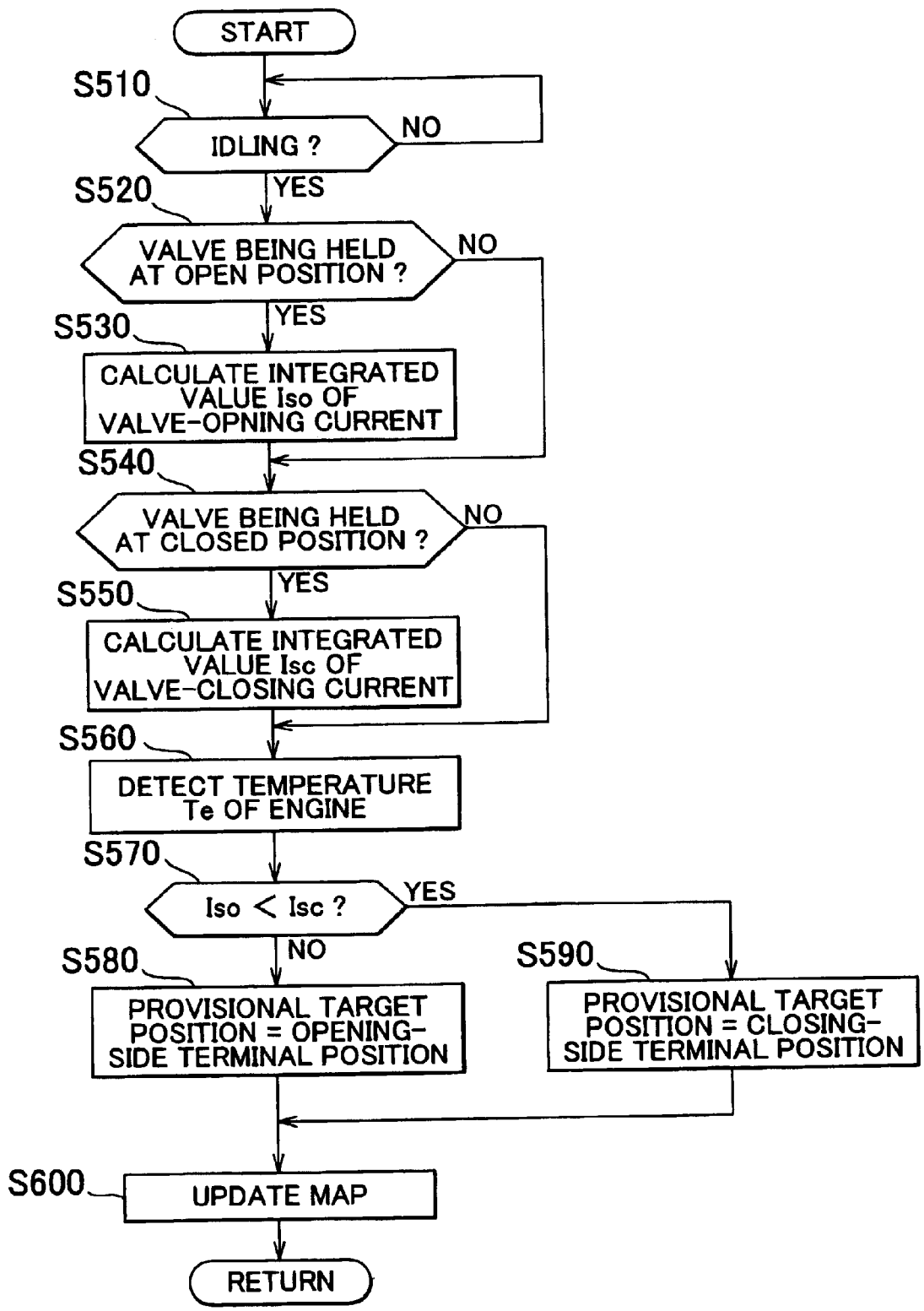
FIG. 10 is a flowchart showing a control routine for judging a provisional target position according to a fifth embodiment of the invention.

While the start control and normal control of the solenoid-operated valves are performed in the fifth embodiment in a similar manner to the above-described second embodiment, the map of TABLE 2 used for determining the provisional target position of the armature 54 is updated according to a control routine shown in FIG. 10. The control according to the flowchart shown in FIG. 10 is started when the ignition switch (not shown) is switched from OFF to ON, and each of step S520 and subsequent steps is executed in a predetermined order with respect to all of the solenoid-operated valves, i.e., the intake valves No. 1–No. 8 and the exhaust valves No. 1–No. 8.

Initially, it is determined in step S510 whether the internal combustion engine 100 is in an idling state, namely, whether the engine 100 is in a certain operating state in which the amounts of intake and exhaust gases of the engine 100 are relatively small. If a negative determination is made, step S510 is repeatedly executed. If an affirmative determination is made, the control process proceeds to step S520.

In step S520, it is determined whether the solenoid-operated valve 10 in question is being driven from the fully closed position to the fully open position with the lower electromagnetic coil 48 being energized. If a negative determination is made in step S520, the control process proceeds to step S540. If an affirmative determination is made in step S520, valve-opening exciting current, namely, an integrated value Iso of exciting current applied to the lower electromagnetic coil 48, is calculated, and the control process proceeds to step S540.

In step S540, it is determined whether the solenoid-operated valve 10 in question is being driven from the fully open position to the fully closed position with the upper electromagnetic coil 46 being energized. If a negative determination is made in step S540, the control process proceeds to step S560. If an affirmative determination is made in step S540, valve-closing exciting current, namely, an integrated value Isc of exciting current applied to the upper electromagnetic coil 46, is calculated, and the control process proceeds to step S560.

In step S560, the temperature Te of the engine 100 is detected by the temperature sensor 78, and it is determined in step S570 whether the integrated value Iso of the valve-opening exciting current is smaller than the integrated value Isc of the valve-closing exciting current. If an affirmative determination is made in step S570, it is determined in step S580 that the provisional target position of the armature 54 of the solenoid-operated valve 10 in question is the opening-side terminal position. If a negative determination is made in step S570, it is determined in step S590 that the provisional target position of the armature 54 of the solenoid-operated valve 10 in question is the closing-side terminal position. In step S600, the map of TABLE 2 is updated based on the temperature Te of the engine 100 and the result of determination in step S580 or step S590.

Figure 6:
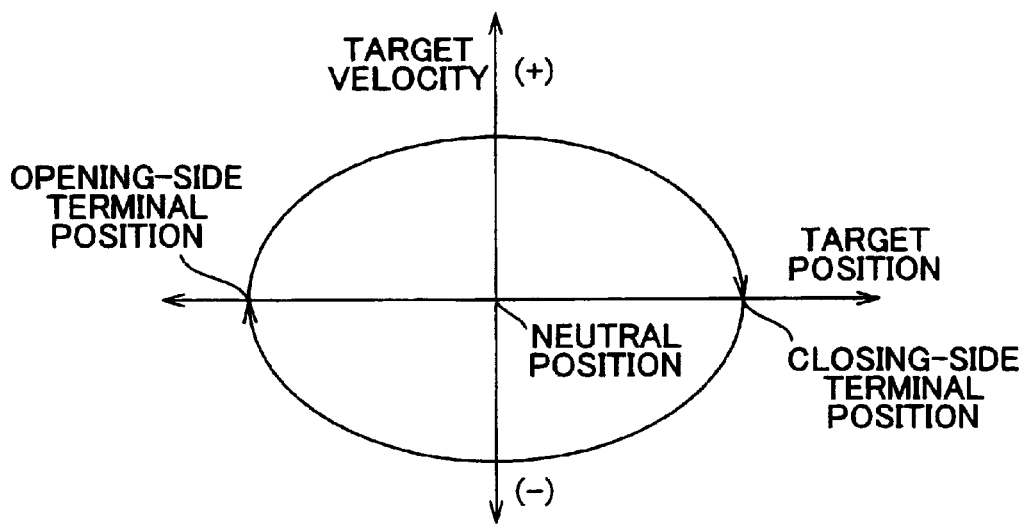
FIG. 6 is a graph indicating the target position and the target velocity on the target phase plane during normal control of the solenoid-operated valves.

As described above, the opening and closing of each solenoid-operated valve 10 are controlled in a feedback manner based on the result of detection of the valve lift sensor 68 so that the position and velocity of the armature 54 become equal to the target position and target velocity in the target phase plane as shown in FIG. 6. Here, the integrated value of the valve-opening exciting current and the integrated value of the valve-closing exciting current are proportional to the magnitude of energy required for moving the armature 54 to the opening-side terminal position and the magnitude of energy required for moving the armature 54 to the closing-side terminal position, respectively. In this embodiment, the provisional target position of the armature 54 is one of the opening-side terminal position and the closing-side terminal position to which the armature 54 is moved with the smaller amount of energy, namely, with the smaller integrated value of exciting current.

Since the map of TABLE 2 is rewritten in accordance with chronological changes in the engine 100 and the solenoid-operated valves 10, the map is suitably arranged to match the actual conditions of the engine 100 and the solenoid-operated valves 10, as in the case of the above-described third and fourth embodiments. Thus, each solenoid-operated valve 10 can be surely and appropriately started even in the presence of chronological changes, such as wear of the valve seat and fatigue of the compression coil springs.

In the fifth embodiment, in particular, the provisional target position of the armature 54 is determined based on the operating conditions of the solenoid-operated valves 10 during a normal operation of the engine 100, without requiring detection of the neutral position Lm of the armature 54. Thus, the map of TABLE 2 can be arranged to match the actual conditions of the engine 100 and the solenoid-operated valves 10 with higher efficiency, as compared with the third and fourth embodiments as described above.

In the fifth embodiment, in particular, the calculation of the integrated value Iso of the valve-opening exciting current and the integrated value Isc of the valve-closing exciting current is effected in a situation where the amounts of intake and exhaust gases of the engine 100 are relatively small and an influence of the force of the intake or exhaust gas on the valve body 22a is relatively small. This arrangement surely avoids a situation that the integrated value Iso of the valve-opening exciting current and the integrated value Isc of the valve-closing exciting current cannot be adequately calculated due to a large influence of the force of the intake or exhaust gas on the valve body 22a. With this arrangement, the provisional target position of the armature 54 can be more appropriately determined, as compared with the case where steps S520–S550 are executed without regard to the operating conditions of the engine 100.

Sixth Embodiment

Figure 11:
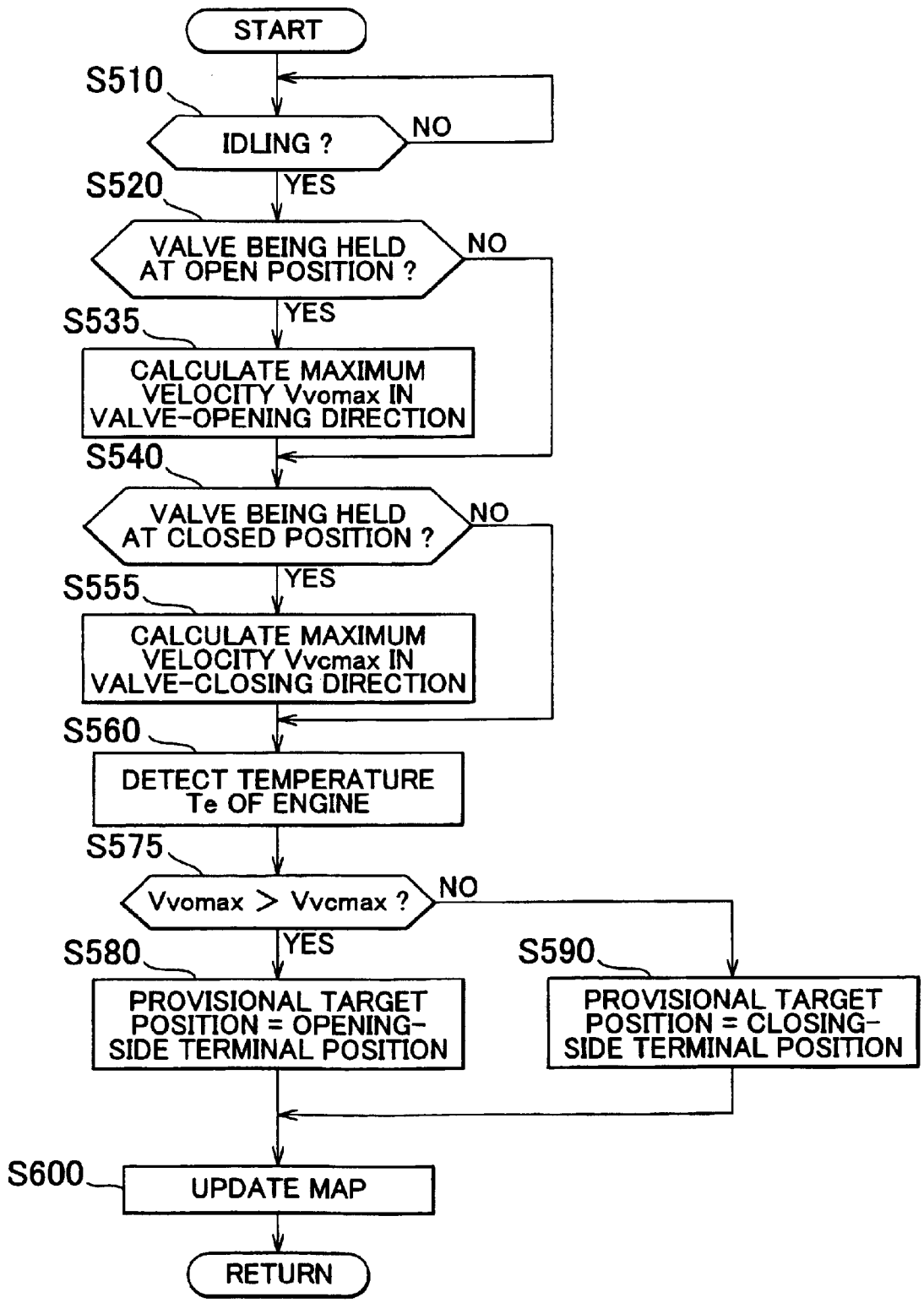
FIG. 11 is a flowchart showing a control routine for judging a provisional target position according to a sixth embodiment of the invention.

While the start control and normal control of the solenoid-operated valves are performed in the sixth embodiment in a similar manner to the above-described second embodiment, the map of TABLE 2 used for determining the provisional target position of the armature 54 is updated according to a control routine shown in FIG. 11. The control according to the flowchart shown in FIG. 11 is started when the ignition switch (not shown) is switched from OFF to ON, and each of step S520 and subsequent steps is executed in a predetermined order with respect to all of the solenoid-operated valves, i.e., the intake valves No. 1–No. 8 and the exhaust valves No. 1–No. 8. In FIG. 11, the same step numbers as used in FIG. 10 are used for identifying the same steps as those shown in FIG. 10.

In the sixth embodiment, when an affirmative determination is made in step S520, namely, when the solenoid-operated valve 10 in question is being driven toward the open position, the maximum velocity Vvomax of the valve body 22a in the valve-opening direction with respect to the solenoid-operated valve 10 in question, namely, the maximum velocity (e.g., the maximum value of differential values of the position L of the armature 54) of the armature 54 in the valve-opening direction, is calculated in step S535.

Similarly, when an affirmative determination is made in step S540, namely, when the solenoid-operated valve 10 in question is being driven toward the closed position, the maximum velocity Vvcmax of the valve body 22a in the valve-closing direction with respect to the solenoid-operated valve 10 in question, namely, the maximum velocity of the armature 54 in the valve-closing direction, is calculated in step S555.

When step S560 is completed, it is determined in step S575 whether the maximum velocity Vvomax in the valve-opening direction is greater than the maximum velocity Vvcmax in the valve-closing direction. If an affirmative determination is made in step S575, it is determined in step S580 that the provisional target position is the opening-side terminal position. If a negative determination is made in step S575, it is determined in step S590 that the provisional target position is the closing-side terminal position. The steps other than the above-described steps are executed in a similar manner to the fifth embodiment as described above.

Figure 12:
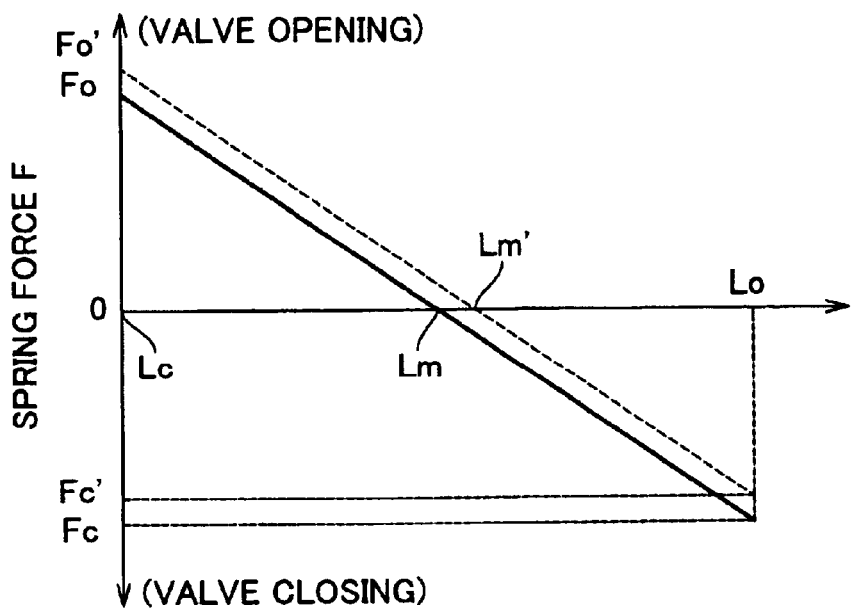
FIG. 12 is a graph showing the relationship between the position L of the armature and the bias force F of compression coil springs.
Figure 13:
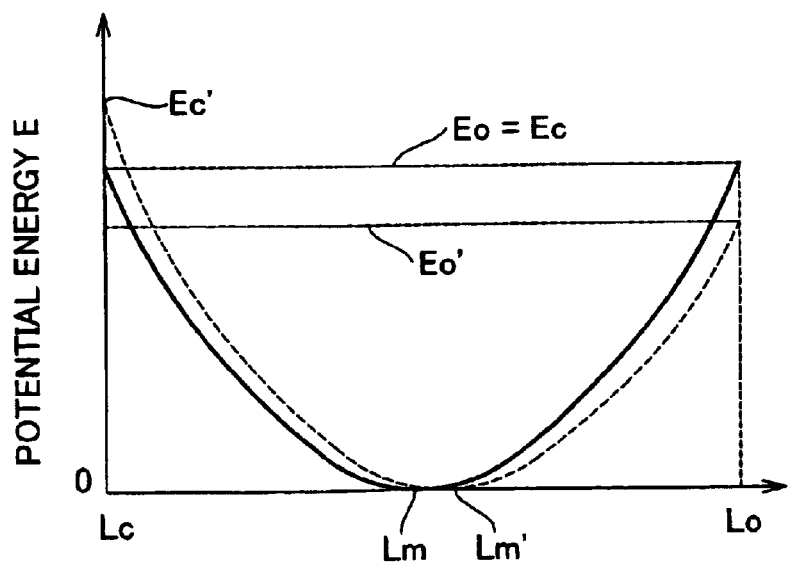
FIG. 13 is a graph showing the relationship between the position L of the armature and the potential energy E produced by the compression coil springs.

FIG. 12 shows the relationship between the position L of the armature 54 and the bias forces F of the compression coil springs 62 and 66. FIG. 13 shows the relationship between the position L of the armature 54 and the potential energies E produced by the compression coil springs 62 and 66. In FIG. 12 and FIG. 13, solid lines indicate the case where the neutral position of the armature 54 is appropriate, namely, a middle position between the opening-side terminal position and the closing-side terminal position, and broken lines indicate the case where the neutral position shifts from the middle position to the valve opening side.

The bias force F and the potential energy E produced by each of the compression coil springs 62 and 66 are expressed by the following expressions (2), (3), where k is a spring constant of the compression coil springs 62, 66.

$$F=-k(L-Lm) \quad (2)$$

$$E=0.5 \times k(L-Lm)^2 \quad (3)$$

If energization of the upper electromagnetic coil 46 is cancelled while the valve body 22a is in the fully closed position (L=Lc), and the armature 54 is moved from the closing-side terminal position to the neutral position, the potential energy of movable members, such as the armature 54, is converted into the kinetic energy, and therefore the relationship of the following expression (4) is established where Vvom represents the velocity of the valve body 22a in the valve-opening direction when the armature 54 reaches the neutral position, and M represents the mass of the movable members. Accordingly, the velocity Vvom is expressed by the following expression (5). Similarly, the relationship of the following expression (6) is established where Vvcm represents the velocity of the valve body 22a in the valve-closing direction when the armature 54 is moved from the opening-side terminal position to the neutral position, and thus the velocity Vvcm is expressed by the following expression (7).

$$0.5 \times M(Vvom)^2 = E \quad (4)$$

$$|Vvom|=|Lc-Lm| \times (k/M)^{1/2} \quad (5)$$

$$0.5 \times M(Vvcm)^2 = E \quad (6)$$

$$|Vvcm|=|Lo-Lm| \times (k/M)^{1/2} \quad (7)$$

From the above expressions (5) and (7), a deviation of the neutral position from the middle position can be determined by comparing the magnitude of the velocity Vvom with the magnitude of the velocity Vvcm. If the difference |Lc−Lm| in the position of the armature 54 is smaller than the difference |Lo−Lm|, the magnitude of the velocity Vvcm in the valve-closing direction becomes larger than the magnitude of the velocity Vvom in the valve-opening direction. Conversely, if the difference |Lo−Lm| in the position of the armature 54 is smaller than the difference |Lc−Lm|, the magnitude of the velocity Vvom in the valve-opening direction becomes larger than the magnitude of the velocity Vvcm in the valve-closing direction. Also, the magnitude of the velocity of the armature 54 is maximized at the neutral position of the armature 54. Thus, the provisional target position of the armature 54 can be judged based on the maximum velocity during driving of each solenoid-operated valve 10 in the opening and closing directions.

Since the motion of the movable members is actually influenced by the frictional force and the residual electromagnetic force, the above-indicated expressions (4)–(7) may not be necessarily satisfied. However, it can be considered that the frictional force and the residual electromagnetic force act on the movable members in substantially the same manner in both the valve-opening direction and the valve-closing direction. Therefore, the provisional target position can be judged based on the maximum velocity of the armature 54 irrespective of the influences of the frictional force and the residual electromagnetic force.

In the sixth embodiment as described above, the maximum velocity Vvomax of the armature 54 in the valve-opening direction while each solenoid-operated valve 10 is being driven to the open position is calculated in steps S520 and S535, and the maximum velocity Vvcmax of the armature 54 in the valve-closing direction while each solenoid-operated valve 10 is being driven to the closed position is calculated in steps S540 and S555. Then, the provisional target position of the armature 54 is judged based on the relationship in magnitude between the maximum velocity Vvomax and the maximum velocity Vvcmax in steps S575–S590, and the map of TABLE 2 is updated in step S600. Accordingly, the map of TABLE 2 can be appropriately changed in accordance with chronological changes in the engine 100 and the respective solenoid-operated valves 10, and therefore each solenoid-operated valve 10 can be surely and appropriately started.

In the sixth embodiment as described above, the provisional target position of the armature 54 is judged based on the maximum velocity Vvomax of the armature 54 in the valve-opening direction and the maximum velocity Vvcmax in the valve-closing direction. The velocity of the armature 54 is calculated for use in feedback control of the position and velocity of the armature 54 during normal control of the solenoid-operated valve 10, and the provisional target position can be judged by utilizing the values calculated during the feedback control. Thus, the provisional target position can be judged without requiring particular calculations for determining the provisional target position.

In the sixth embodiment, in particular, the calculations of the maximum velocity Vvomax and the maximum velocity Vvcmax of the armature 54 in the valve-opening direction and the valve-closing direction are effected while the engine 100 is in an idling operation. This arrangement surely avoids a situation that the maximum velocity Vvomax in the valve-opening direction and the maximum velocity Vvcmax in the valve-closing direction cannot be adequately calculated due to a relatively large influence of the force of the intake or exhaust gas on the valve body 22a. With this arrangement, the provisional target position of the armature 54 can be more appropriately judged, as compared with the case where steps S520–S555 are executed without regard to the operating conditions of the engine 100.

Seventh Embodiment

In the seventh embodiment, the backup RAM of the electronic control unit 70 stores a map indicating the relationship between the temperature Te of the internal combustion engine 100 and the output voltage Vao of the valve lift sensor 68 detected when the armature 54 is located in the opening-side terminal position, which relationship is obtained in advance with respect to the intake valves No. 1–No. 8 and the exhaust valves. No. 1–No. 8. This relationship is shown in TABLE 3 below. The backup RAM also stores a map indicating the relationship between the temperature Te of the engine 100 and the output voltage Vac of the valve lift sensor 68 detected when the armature 56 is located in the closing-side terminal position, which relationship is obtained in advance with respect to the intake valves No. 1–No. 8 and the exhaust valves No. 1–No. 8. This relationship is shown in TABLE 4 below.

TABLE 3

| | Temp. Te (° C.) | | | | | |
|---|---|---|---|---|---|---|
| | −40 | −20 | 0 | 20 | ... | 120 |
| Intake Valve No. 1 Open | 0.75 | 0.71 | 0.68 | 0.65 | ... | 0.3 |
| Intake Valve No. 2 Open | 0.75 | 0.71 | 0.68 | 0.65 | ... | 0.3 |
| ... | ... | ... | ... | ... | | ... |
| Intake Valve No. 8 Open | 0.75 | 0.71 | 0.68 | 0.65 | ... | 0.3 |
| Exhaust Valve No. 1 Open | 0.75 | 0.71 | 0.68 | 0.65 | ... | 0.3 |
| Exhaust Valve No. 2 Open | 0.75 | 0.71 | 0.68 | 0.65 | ... | 0.3 |
| ... | ... | ... | ... | ... | | ... |
| Exhaust Valve No. 8 Open | 0.75 | 0.71 | 0.68 | 0.65 | ... | 0.3 |

TABLE 4

| | Temp. Te (° C.) | | | | | |
|---|---|---|---|---|---|---|
| | −40 | −20 | 0 | 20 | ... | 120 |
| Intake Valve No. 1 Closed | 4.75 | 4.71 | 4.68 | 4.65 | ... | 4.25 |
| Intake Valve No. 2 Closed | 4.75 | 4.71 | 4.68 | 4.65 | ... | 4.25 |
| ... | ... | ... | ... | ... | | ... |
| Intake Valve No. 8 Closed | 4.75 | 4.71 | 4.68 | 4.65 | ... | 4.25 |
| Exhaust Valve No. 1 Closed | 4.75 | 4.71 | 4.68 | 4.65 | ... | 4.25 |
| Exhaust Valve No. 2 Closed | 4.75 | 4.71 | 4.68 | 4.65 | ... | 4.25 |
| ... | ... | ... | ... | ... | | ... |
| Exhaust Valve No. 8 Closed | 4.75 | 4.71 | 4.68 | 4.65 | ... | 0.3 |

Figure 14:
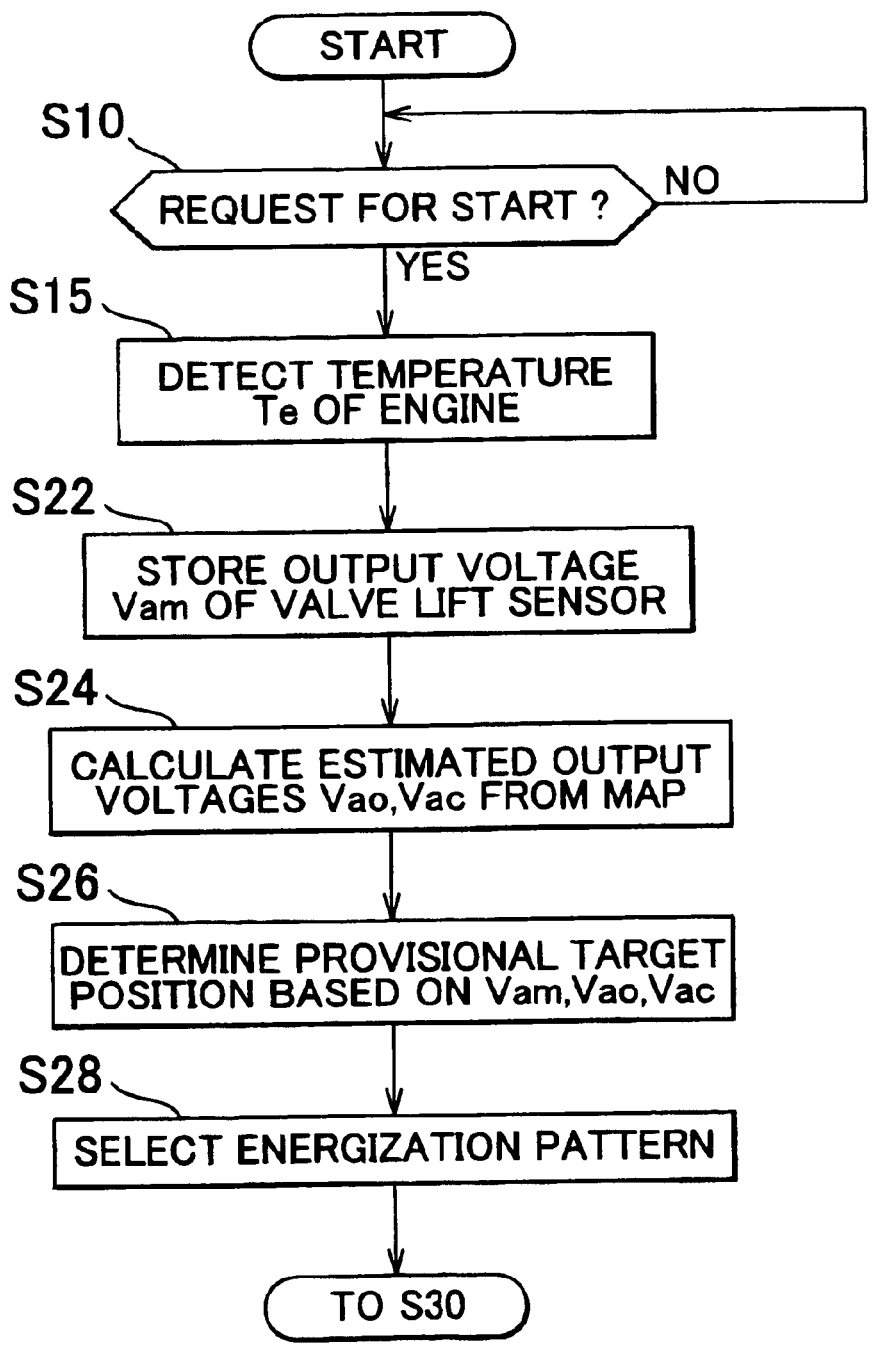
FIG. 14 is a flowchart showing a principal part of a routine of start control and normal control of solenoid-operated valves according to a seventh embodiment of the invention.
Figure 15:
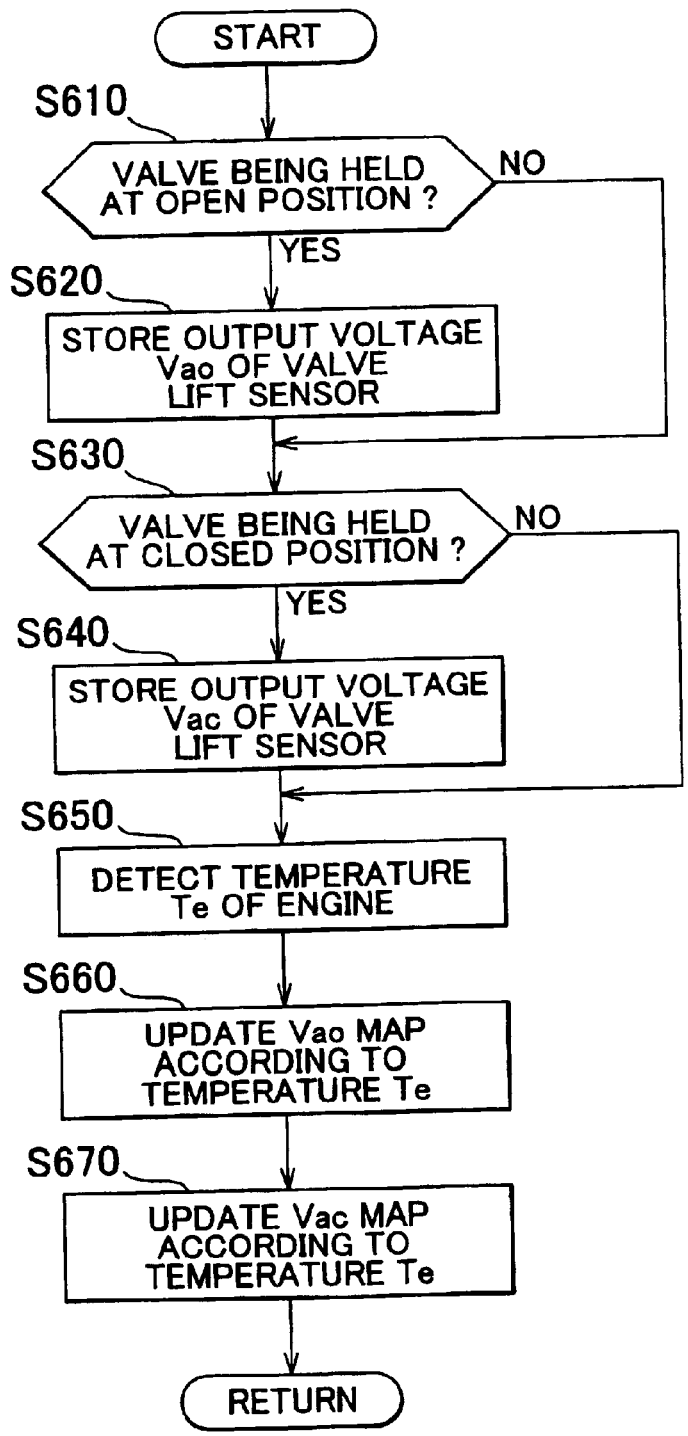
FIG. 15 is a flowchart showing a control routine for updating a map according to the seventh embodiment.

The electronic control unit 70 performs start control and normal control of each solenoid-operated valve 10 according to the flowchart shown in FIG. 14, during starting and normal operations of the engine 100. Also, the electronic control unit 70 updates the maps of TABLE 3 and TABLE 4 according to a control routine as shown in FIG. 15. In FIG. 14, the same step numbers used in FIG. 7 are used for identifying the same steps as those indicated in FIG. 7.

In the seventh embodiment, as shown in FIG. 14, upon completion of step S15, the output voltage Vam of the valve lift sensor 68 detected when the armature 54 is located at the neutral position is stored in the RAM in step S22. In step S24, an estimated output voltage Vao of the valve lift sensor 68 when the armature 54 is located in the opening-side terminal position is calculated from the map of TABLE 3, based on the temperature Te of the engine 100, and an estimated output voltage Vac of the valve lift sensor 68 when the armature 54 is located in the closing-side terminal position is calculated from the map of TABLE 4, based on the temperature Te of the engine 100.

In this case, when the detected temperature Te of the engine 100 is an intermediate value between two adjacent temperatures indicated in TABLE 3 and TABLE 4, the estimated output voltage Vao and the estimated output voltage Vac associated with the detected temperature Te are calculated through proportional distribution performed on the estimated output voltages corresponding to the two adjacent temperatures in the tables which are close to the detected temperature.

In step S26 following step S24, the provisional target position of the armature 54 is determined based on a difference Vam–Vao of the output voltages and a difference Vac–Vam. Namely, one of the opening-side terminal position and the closing-side terminal position, whose difference from the neutral position is smaller than that of the other position, is determined as the provisional target position. In step S28, the energization pattern A or B is selected depending upon the provisional target position thus determined, and the control process then proceeds to step S30.

In the seventh embodiment, as shown in FIG. 15, it is determined in step S610 whether the solenoid-operated valve 10 in question is being held in the open position. If a negative determination is made in step S610, the control process proceeds to step S630. If an affirmative determination is made in step S610, the output voltage Vao of the valve lift sensor 68 is stored in the RAM in step S620, and the control process then proceeds to step S630.

In step S630, it is determined whether the solenoid-operated valve 10 in question is being held in the closed position. If a negative determination is made in step S630, the control process proceeds to step S650. If an affirmative determination is made in step S630, the output voltage Vac of the valve lift sensor 68 is stored in the RAM in step S640, and the control process then proceeds to step S650.

In step S650, the temperature Te of the engine 100 is detected by the temperature sensor 78. Then, the map of TABLE 3 (listing the values of the output voltage Vao) is updated according to the detected temperature Te in step S660, and the map of TABLE 4 (listing the values of the output voltage Vac) is updated according to the detected temperature Te in step S670.

In the seventh embodiment as described above, the temperature Te of the engine 100 is detected in step S15, and the output voltage Vam of the valve lift sensor 68 detected when the armature 54 is located at the neutral position is obtained in step S22. In step S24, the estimated output voltage Vao of the valve lift sensor 68 when the armature 54 is located in the opening-side terminal position and the estimated output voltage Vac of the valve lift sensor 68 when the armature 54 is located in the closing-side terminal position are calculated based on the temperature Te. Then, the provisional target position of the armature 54 is determined in step S26, based on the result of comparison between the differences (Vam−Vao) and (Vac−Vam) in the output voltage.

As is understood from the expression (1) as indicated above, the relationship between the difference (Vam−Vao) and the difference (Vac−Vam) in the output voltage corresponds to the relationship between the distance between the neutral position Lm and the opening-side terminal position Lo of the armature 54 and the distance between the neutral position Lm and the closing-side terminal position Lc, respectively. Thus, one of the opening-side terminal position and the closing-side terminal position, whose difference from the neutral position is smaller than that of the other position, is determined as the provisional target position of the armature 54.

In the seventh embodiment, the output voltage Vao of the valve lift sensor 68 when the armature 54 is located at the opening-side terminal position and the output voltage Vac of the lift sensor 68 when the armature 54 is located at the closing-side terminal position can be estimated merely by detecting the temperature Te of the engine 100 at the time of a start of each solenoid-operated valve 10 and obtaining the output voltage Vam of the valve lift sensor 68 when the armature 54 is located at the neutral position. Then, the provisional target position of the armature 54 can be determined based on the output voltage Vam and the estimated output voltages Vao and Vac. In the seventh embodiment, therefore, the provisional target position can be determined more easily and efficiently, as compared with the cases of the third through sixth embodiments as described above.

In the seventh embodiment, in particular, while the engine 100 is in a normal operating state, the output voltage Vao of the valve lift sensor 68 when the armature 54 is located at the opening-side terminal position and the output voltage Vac of the valve lift sensor 68 when the armature 54 is located at the closing-side terminal position are obtained in steps S610–S640, and the temperature Te of the engine 100 is detected in step S650. Then, the map of TABLE 3 (listing values of the output voltage Vao) and the map of TABLE 4 (listing values of the output voltage Vac) are updated in steps S660 and S670 according to the temperature Te. Thus, similarly to the third through sixth embodiments, the maps of TABLE 3 and TABLE 4 can be appropriately changed in accordance with chronological changes in the engine 100 and each of the solenoid-operated valves 10, whereby each solenoid-operated valve 10 can be surely and appropriately started irrespective of the chronological changes in the engine 100 and each solenoid-operated valve 10.

Since the target opening-side terminal position and target closing-side terminal position of the armature 54 can be calculated according to the above expression (1) based on the output voltages Vao and Vac of TABLE 3 and TABLE 4, the target phase plane as shown in FIG. 6 can be optimized for each solenoid-operated valve in view of chronological changes in the engine 100 and each solenoid-operated valve 10. With the target phase plane thus optimized, the feedback control of each solenoid-operated valve during normal operations of the engine 100 can be optimized.

Eighth Embodiment

Figure 16:
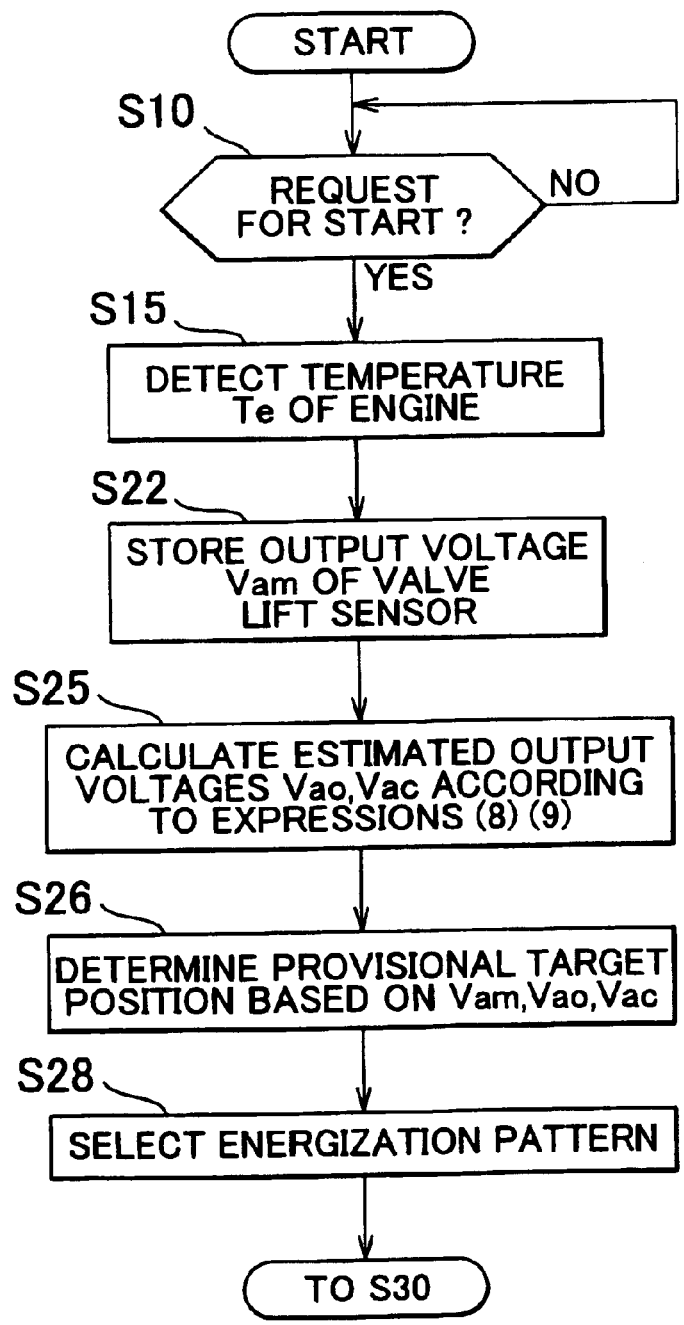
FIG. 16 is a flowchart showing a principal part of a routine of start control and normal control of solenoid-operated valves according to an eighth embodiment of the invention.

In the eighth embodiment, while the ROM of the electronic control unit 70 stores energization patterns A, B according to which the upper electromagnetic coil 46 and the lower electromagnetic coil 48 are energized during starting of the solenoid-operated valve, and other data, the backup ROM of the control unit 70 does not store maps corresponding to TABLES 1–4 as indicated above, but instead stores expressions (8) and (9) as indicated below. The electronic control unit 70 perform start control and normal control of each solenoid-operated valve 10 according to the flowchart shown in FIG. 16, during starting and normal operations of the engine 100. In FIG. 16, the same step numbers as used in FIG. 14 are used for identifying the same steps as those indicated in FIG. 14.

In the eighth embodiment, as shown in FIG. 16, step S22 is followed by step S25 in which an estimated output voltage Vao of the valve lift sensor 68 when the armature 54 is located at the opening-side terminal position and an estimated output voltage Vac of the valve lift sensor 68 when the armature 54 is located at the closing-side terminal position are calculated according to the following expressions (8) and (9), based on the temperature Te of the engine 100 detected in step S15. Subsequently, steps S26 and S28 similar to those of the seventh embodiment are executed.

$$Vao = Vaon + Ko(Te - Ten) \quad (8)$$

$$Vac = Vacn + Kc(Te - Ten) \quad (9)$$

In the above expressions (8) and (9), Vaon and Vacn represent the output voltages Vao and Vac of the valve lift sensor 68 detected when the temperature Te of the engine 100 is equal to a predetermined temperature Ten. For example, Vaon and Vacn are set at the time of delivery or shipping of the vehicle. Also, Ko and Kc are coefficients that are set at the time of delivery or shipping of the vehicle. Although not illustrated in the drawings, the coefficients Ko and Kc are occasionally updated based on the temperature Te of the engine 100, the output voltage Vao of the valve lift sensor 68 when the armature 54 is located at the opening-side terminal position, and the output voltage Vac of the valve lift sensor 68 when the armature 54 is located at the closing-side terminal position, during normal operations of the engine 100. If the output voltage of the valve lift sensor 68 linearly changes with the temperature Te of the engine 100, the coefficients Ko and Kc assume the same value. However, the output voltage of the valve lift sensor 68 is often changes non-linearly with the temperature Te of the engine 100, and therefore these coefficients are desirably set independently of each other.

In the eighth embodiment, similarly to the seventh embodiment as described above, the output voltage Vao of the valve lift sensor 68 when the armature 54 is located at the opening-side terminal position and the output voltage Vac of the valve lift sensor 68 when the armature 54 is located at the closing-side terminal position can be estimated merely by detecting the temperature Te of the engine 100 and obtaining the output voltage Vam of the valve lift sensor 68 when the armature 54 is located at the neutral position at the time of a start of each solenoid-operated valve 10. Thus, the provisional target position of the armature 54 can be more easily and efficiently determined based on the output voltages Vam, Vao and Vac, as compared with the cases of the third through sixth embodiments.

Also, in the eighth embodiment, there is no need to store the relationships between the temperature Te of the engine 100 and the output voltages Vao and Vac of the valve lift sensor 68 as in the above-described seventh embodiment. Accordingly, the storage capacity of the backup RAM can be smaller than that of the seventh embodiment, resulting in reduced cost.

In the eighth embodiment, in particular, the coefficients Ko and Kc in the above-indicated expressions (8) and (9) are occasionally updated based on the temperature Te of the engine 100, the output voltage Vao of the valve lift sensor 68 when the armature 54 is located at the opening-side terminal position, and the output voltage Vac of the valve lift sensor 68 when the armature 54 is located at the closing-side terminal position, during normal operations of the engine 100. Thus, similarly to the third through seventh embodiments, the expressions (8) and (9) can be appropriately changed according to chronological changes in the engine 100 and each of the solenoid-operated valves 10, and therefore each solenoid-operated valve 10 can be surely and appropriately started irrespective of the chronological changes in the engine 100 and each solenoid-operated valve 10.

Ninth Embodiment

Figure 17:
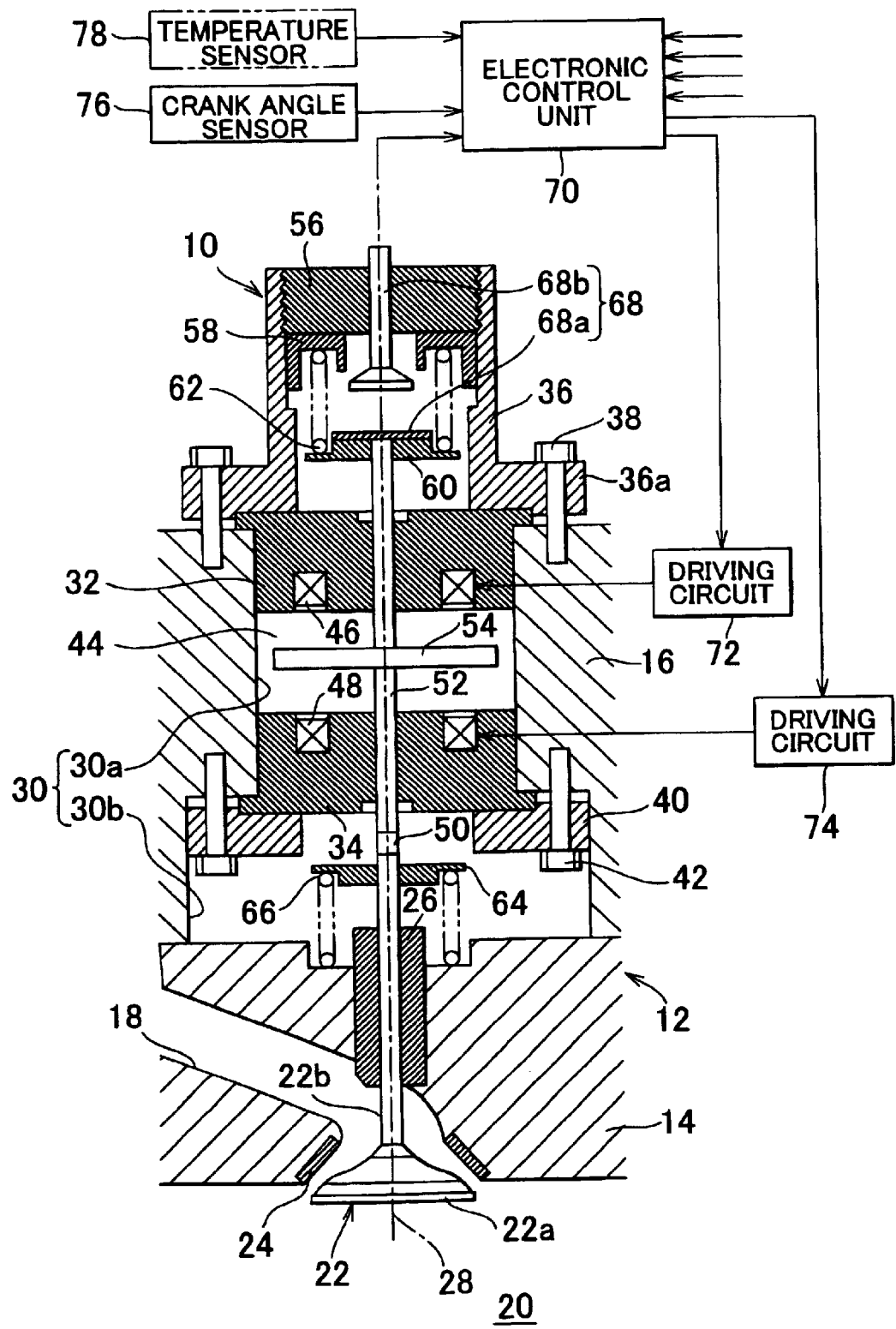
FIG. 17 is a schematic view showing a solenoid-operated valve controlled according to a ninth embodiment of the invention, which valve includes a lash adjuster between a stem of an intake valve and an armature stem.

In the ninth embodiment, the solenoid-operated valve 10 includes a hydraulic lash adjuster having a know structure. As shown in FIG. 17, a lash adjuster 50 is attached to the upper end of the stem 22b of the intake valve 22 through cap-type fitting, and the lower end of the armature stem 52 abuts on the upper end of the lash adjuster 50.

When there is a clearance between the upper end of the lash adjuster 50 and the lower end of the armature stem 52, the length of the lash adjuster 50 is increased by a spring disposed in the lash adjuster 50 so as to eliminate the clearance. When the lash adjuster 50 is strongly compressed by the stem 22b of the intake valve 22 and the armature stem 52, on the other hand, reaction force is generated by a liquid contained in a high-pressure chamber within the lash adjuster 50, so that the length of the lash adjuster 50 is maintained.

In the ninth embodiment, the electronic control unit 70 has a timer that is started when an operation of the engine 100 is stopped and counts an elapsed time ΔTt from a point of time when the operation of the engine 100 is stopped. The electronic control unit 70 changes the manner of determining the provisional target position of the armature 54 depending upon the elapsed time ΔTt.

Figure 18:
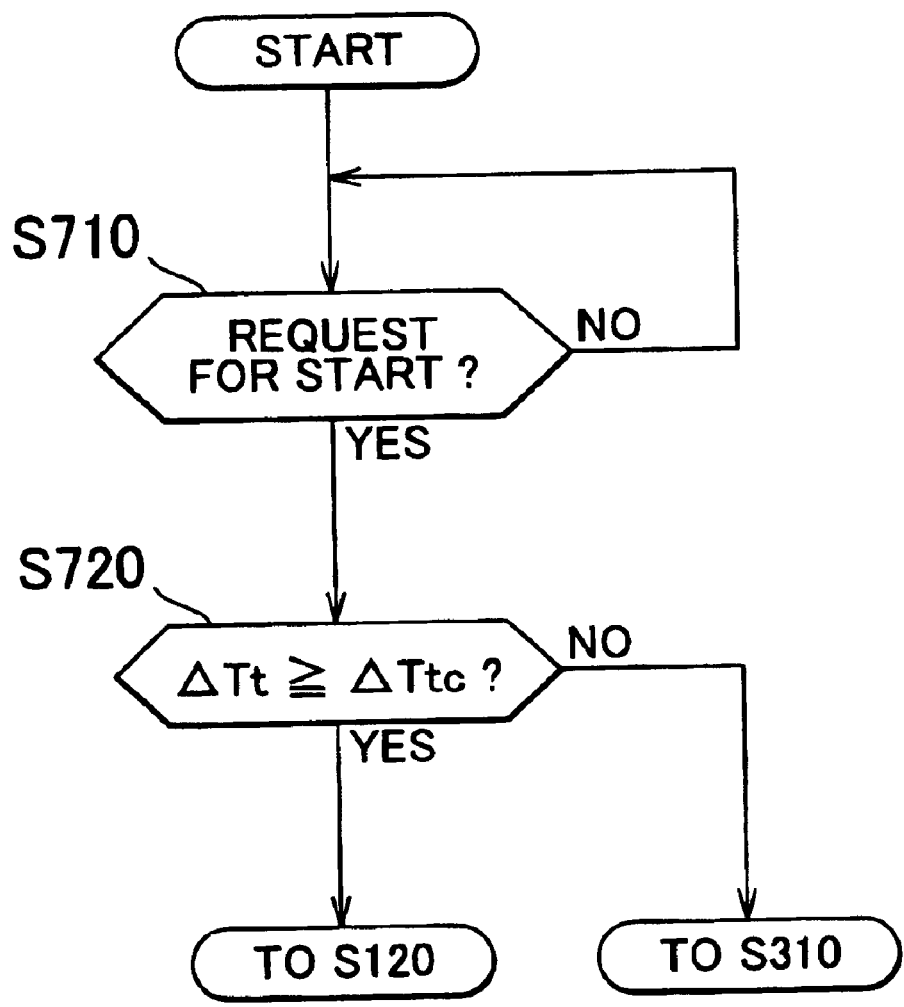
FIG. 18 is a flowchart showing a principal part of a routine of start control and normal control of the solenoid-operated valve according to the ninth embodiment.

In the ninth embodiment, as shown in FIG. 18, when an affirmative determination is made in step S710 corresponding to step S10 of the above-described embodiments, namely, when a request for a start of the solenoid-operated valves 10 is generated, it is determined in step S720 whether the elapsed time ΔTt is equal to or greater than a reference value ΔTtc (positive constant). If an affirmative determination is made in step S720, the control process proceeds to step S120 of the third embodiment as described above. If a negative determination is made in step S720, the control process proceeds to step S310 of the fourth embodiment as described above.

Generally, when the solenoid-operated valve has a hydraulic lash adjuster, the neutral position of the armature 54 detected at the time of a start of the engine is different from the neutral position detected at the time of a finish of the operation of the engine even if the engine 100 has the same temperature. In the hydraulic lash adjuster, the high-pressure chamber inside the adjuster is rapidly filled with oil each time the solenoid-operated valve is closed, and the oil bleeds out of the high-pressure chamber in other conditions than the closed state, namely, while a compression load is applied to the lash adjuster. Thus, the length of the lash adjuster is relatively large when the high-pressure chamber is filled with the oil, and decreases as the oil is discharged from the high-pressure chamber.

Accordingly, when the engine 100 is re-started immediately after the engine 100 is stopped, the length of the lash adjuster is not sufficiently reduced, and therefore the provisional target position of the armature 54 is preferably determined based on the map that is updated based on the results of detection immediately after the stop of the operation of the engine 100. When the engine 100 is re-started after a sufficient time elapses from a point of time when the engine 100 is stopped, the length of the lash adjuster is sufficiently reduced, and therefore the provisional target position of the armature 54 is preferably determined based on the map that is updated based on the results of detected at the time of a start of the engine 100.

In the ninth embodiment as described above, it is determined in step S720 whether the elapsed time ΔTt from the time when the operation of the engine 100 is stopped is equal to or greater than the reference value ΔTtc, and the control process proceeds to step S120 of the third embodiment when an affirmative determination is made, while the control process proceeds to step S310 of the fourth embodiment when a negative determination is made. Thus, the provisional target position of the armature 54 can be appropriately determined depending upon the length of the lash adjuster, thus making it possible to surely and appropriately start the solenoid-operated valve incorporating the hydraulic lash adjuster.

In the first through ninth embodiments as described above, the movement of the armature 54 is started in a direction toward the opening-side terminal position when the provisional target position of the armature 54 is the opening-side terminal position, and the movement of the armature 54 is started in a direction toward the closing-side terminal position when the provisional target position of the armature 54 is the closing-side terminal position. However, the movement of the armature 54 may be started in a direction toward the closing-side terminal position when the provisional target position of the armature 54 is the opening-side terminal position, and the movement of the armature 54 may be started in a direction toward the opening-side terminal position when the provisional target position of the armature 54 is the closing-side terminal position.

In the first through ninth embodiments as described above, the armature 54 is initially driven a slight distance from the neutral position upon a start of the solenoid-operated valve 10 in question, and the reciprocation stroke of the armature 54 is progressively increased until the armature 54 reaches the provisional target position. However, each solenoid-operated valve 10 of these embodiments may be modified so that the armature 54 is directly moved to the provisional target position.

In the second through ninth embodiments as described above, the intervals of the temperatures in TABLE 2 through TABLE 4 are uniform intervals of 20° C. However, the temperature intervals in each table may be changed as desired to, for example, 10° C., or may not be uniform intervals. In the latter case, the temperature intervals may be set such that the intervals within or around a normal temperature range are smaller than those within the other temperature ranges.

While the lash adjuster 50 is provided between the armature stem 52 and the stem 22b of the valve body 22 in the ninth embodiment as described above, no lash adjuster is provided in the first through eighth embodiments. However, any of the first through eighth embodiments may be applied to solenoid-operated valves equipped with lash adjusters.

Tenth Embodiment

In a solenoid-operated valve controlled according to the tenth embodiment of the invention, the neutral position of the armature 54 is shifted from the middle position between the opening-side terminal position and the closing-side terminal position, to the valve-closing side. During a starting period of the solenoid-operated valve, the armature 54 is moved from the neutral position to the closing-side terminal position.

Examples of methods of shifting the neutral position toward the closing-side terminal position include: (1) making the free length of the compression coil spring 62 larger than that of the compression coil spring 66, (2) making the spring constant of the compression coil spring 62 smaller than that of the compression soil spring 66, (3) shifting the mounting position of the armature 54 on the armature stem 52 toward the upper core 32, and (4) applying a pre-load to the compression coil spring 62 thereby to reduce the length of the compression coil spring 62. When the solenoid-operated valve 10 is equipped with the adjuster bolt 56 as in the present embodiment, the neutral position may be shifted by means of the adjuster bolt 56.

Figure 19:
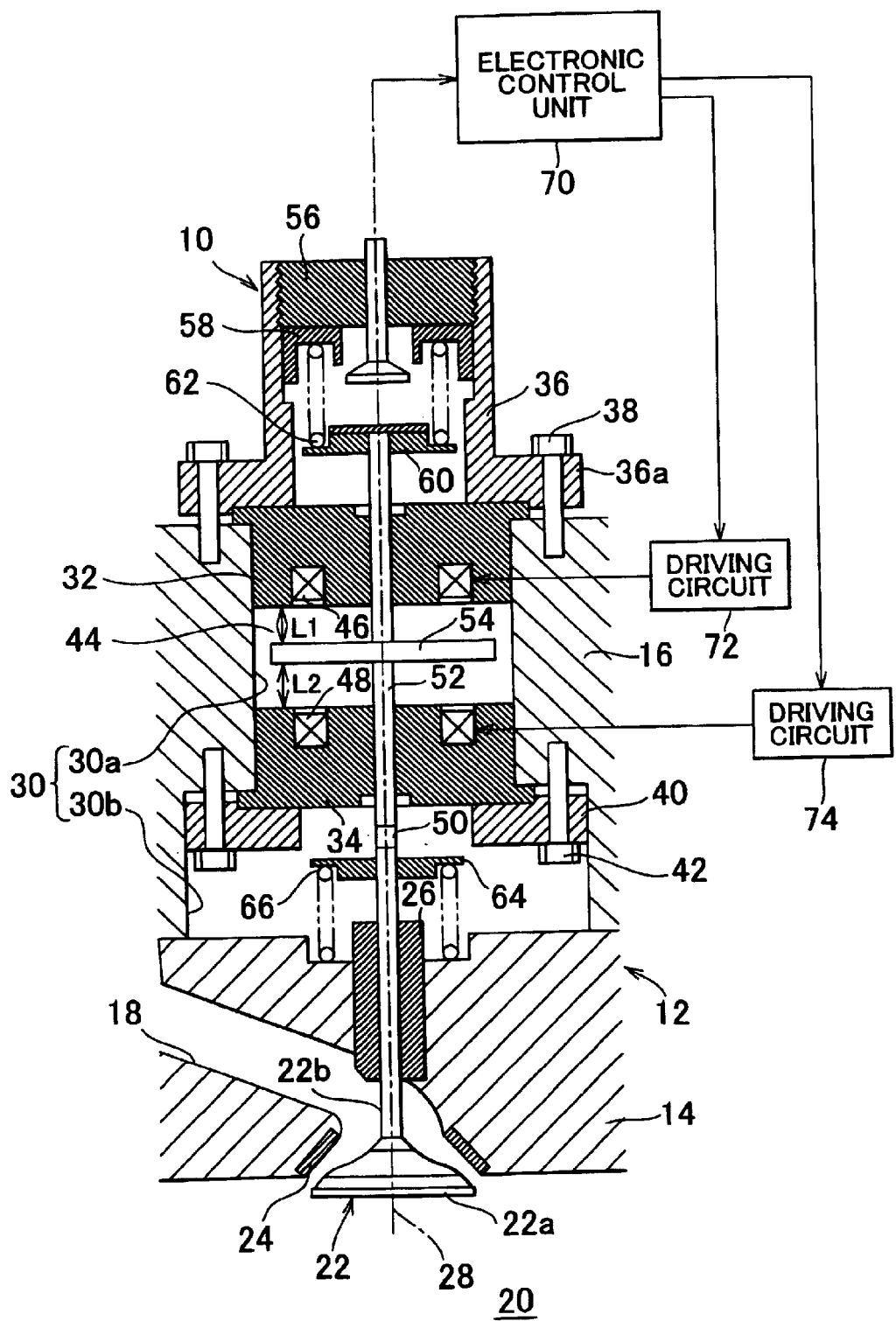
FIG. 19 is a schematic view showing the construction of a solenoid-operated valve for an internal combustion engine that is controlled according to a tenth embodiment of the invention.

With the neutral position thus shifted toward the upper core 43, the distance L1 between the armature 54 and the upper core 32 becomes shorter than the distance L2 between the armature 54 and the lower core 34, as shown in FIG. 19. With this arrangement, the armature 54 located at the neutral position is more likely to be moved to the closing-side terminal position than to the opening-side terminal position.

In start control according to the tenth embodiment, the electronic control unit 70 controls the driving circuits 72 and 74 so as to move the armature 54 to the closing-side terminal position. Also, the electronic control unit 70 is arranged to apply the initial exciting current to the upper electromagnetic coil 46 upon a start of the solenoid-operated valve 10.

Figure 20:
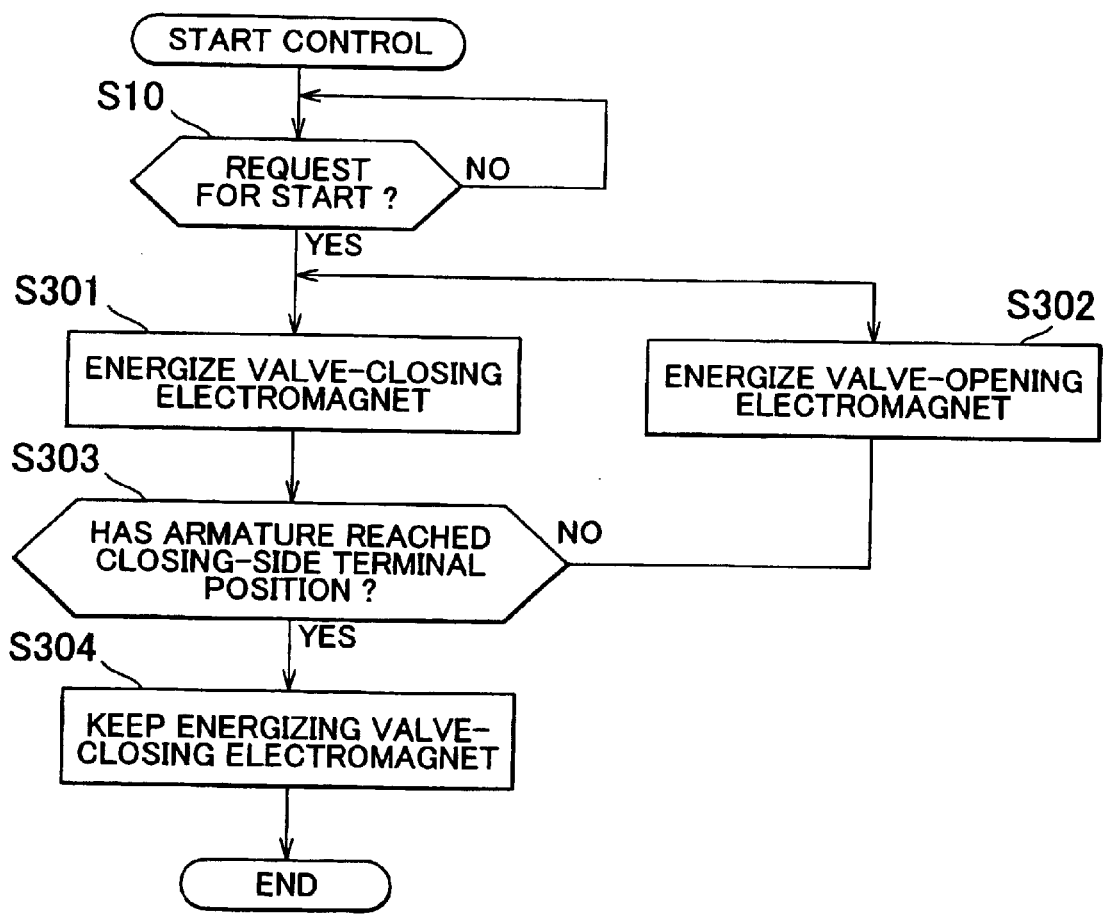
FIG. 20 is a flowchart showing a start control routine according to the tenth embodiment.

Next, start control of the solenoid-operated valve 10 according to the tenth embodiment will be described with reference to FIG. 20. FIG. 20 is a flowchart showing a start control routine to be executed by the electronic control unit 70. This start control routine is initiated when the ignition switch (not shown) is switched from OFF to ON.

The electronic control unit 70 determines in step S10 whether a request for a start of the solenoid-operated valve 10 is generated. If it is determined in step S10 that no request for a start is generated, the electronic control unit 70 executes step S10 again.

If it is determined in step S10 that a request for a start of the solenoid-operated valve 10 is generated, the electronic control unit 70 proceeds to step S301 to control the driving circuit 72 so as to apply exciting current to the upper electromagnetic coil 46.

In step S303, the electronic control unit 70 determines whether the armature 54 has reached the closing-side terminal position.

If it is determined in step S303 that the armature 54 has not reached the closing-side terminal position, the electronic control unit 70 proceeds to step S302 to control the driving circuit 74 so as to apply exciting current to the lower electromagnetic coil 48. Thereafter, step S301 and subsequent steps are executed again.

With steps S301–S303 thus repeatedly executed, the amplitude of the armature 54 is progressively increased, and the armature 54 eventually reaches the closing-side terminal position. If the armature 54 reaches the closing-side terminal position, the electronic control unit 70 determines in step S303 that the armature 54 has reached the closing-side terminal position, and proceeds to step S304.

In step S304, the electronic control unit 70 causes the driving circuit 72 to keep applying exciting current to the upper electromagnetic coil 46 so that the intake valve 22 is held in the fully closed position. If the target position to be reached during starting of the solenoid-operated valve 10 is the opening-side terminal position, the electronic control unit 70 may control the valve-opening electromagnet (34, 48) and the valve-closing electromagnet (32, 46) so as to move the armature 54 from the closing-side terminal position to the opening-side terminal position after step S304 is executed.

With the start control routine thus executed by the electronic control unit 70, the armature 54 is able to reach the closing-side terminal position from the neutral position without increasing an amount of electric power consumption during start control of the solenoid-operated valve 10. Consequently, the internal combustion engine can be favorably started without increasing the amount of electric power consumption.

Furthermore, since the initial exciting current is applied to the upper electromagnetic coil 46 upon a start of the solenoid-operated valve 10 in the process of step S301 through step S303, the armature 54 can be moved from the neutral position to the closing-side terminal position with reduced exciting current applied to the valve-closing electromagnet (32, 46). Thus, the electric power consumption during start control can be further reduced.

While the armature 54 is shifted to the valve-closing side, i.e., toward the closing-side terminal position in the tenth embodiment described above, the armature 54 may be shifted to the valve-opening side, i.e., toward the opening-side terminal position.

It is, however, preferable to shift the neutral position of the armature 54 to the valve-closing side in order to reduce the amount of electric power consumption during an operation of the internal combustion engine, for the following reason.

If the neutral position of the armature 54 is shifted to one of the valve-opening side and the valve-closing side, the amount of exciting current required for holding the armature 54 at the terminal position toward which the neutral position is shifted is reduced, as compared with the case where the neutral position is not shifted from the middle position, and the amount of exciting current required for holding the armature 54 at the other terminal position is increased, as compared with the case where the neutral position is not shifted. It is also to be noted that a period of time in which the intake valve 22 is open during an operation of the engine is considerably shorter than a period of time in which the valve 22 is closed. If the neutral position of the armature 54 is shifted to the valve-closing side, therefore, the armature 54 can be surely moved to the closing-side terminal position at the time of a start of the solenoid-operated valve 10 without undesirably increasing the amount of exciting current, and the amount of exciting current during an operation of the engine can also be reduced.

In the case where the solenoid-operated valve 10 drives an exhaust valve of the engine for opening or closing the same, the neutral position of the armature 54 may be shifted to the valve-opening side, i.e., toward the opening-side terminal position. Generally, the pressure within the combustion chamber 20 is high when the exhaust valve is opened, and the amount of exciting current required for opening the exhaust valve is likely to be increased. If the neutral position of the armature 54 is shifted to the valve-opening side, the exhaust valve is more likely to be opened, and the amount of exciting current required for opening the exhaust valve can be reduced.

In the case where the neutral position of the armature 54 is shifted to the valve-opening side, a lock mechanism may be provided for holding the armature 54 at the closing-side terminal position. The lock mechanism may be in the form of, for example, a permanent magnet disposed in the vicinity of the closing-side terminal position, or a mechanism that protrudes into the inner space 44 by a hydraulic pressure, or the like, so as to restrict displacement of the armature 54 in the valve-opening direction when the armature 54 is moved to the opening-side terminal position.

In this case, even if the neutral position of the armature 54 is shifted to the valve-opening side, the amount of exciting current required for holding the armature 54 at the closing-side terminal position can be reduced.

Eleventh Embodiment

Next, an eleventh embodiment of the invention will be described with reference to FIG. 21. While the neutral position of the armature 54 is shifted to the valve-closing side so that the armature 54 is more likely to be moved in the valve-closing direction (i.e., toward the closing-side terminal position) in the tenth embodiment as described above, the neutral position of the armature 54 is located at the middle position between the valve-opening electromagnet (34, 48) and the valve-closing electromagnet (32, 46) but still the armature 54 is more likely to be moved in the valve-closing direction in the eleventh embodiment.

Figure 21:
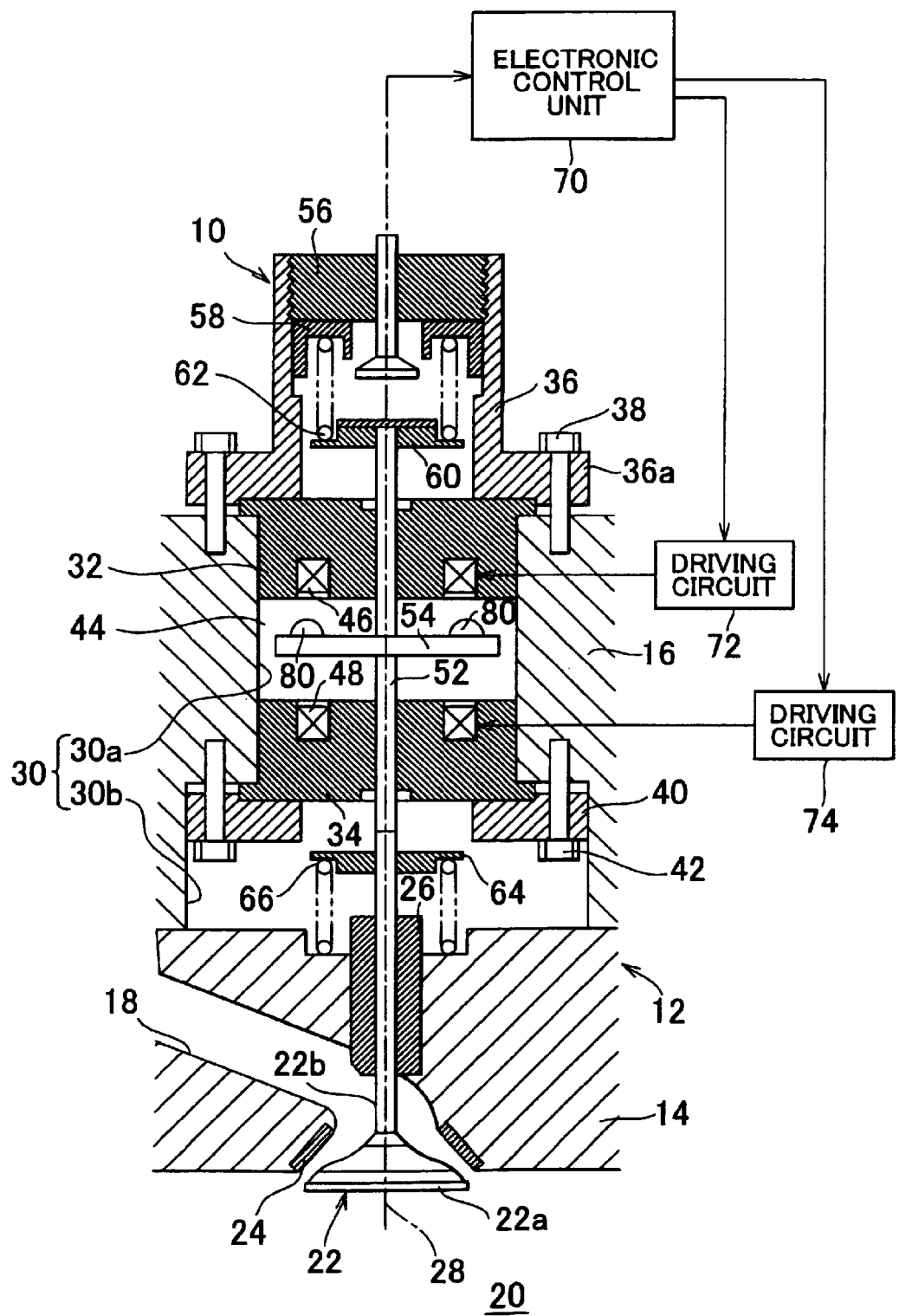
FIG. 21 is a schematic view showing the construction of a solenoid-operated valve for an internal combustion engine that is controlled according to an eleventh embodiment of the invention.

Examples of methods of making the armature 54 more likely to be moved toward the closing-side terminal position than to the opening-side terminal position include providing a protruding portion 80 on a surface of the armature 54 that faces the valve-closing electromagnet (32, 46), as shown in FIG. 21.

Here, the protruding portion 80 is preferably located at a position where the electromagnetic force of the valve-closing electromagnet (32, 46) is less likely to be applied. For example, since the electromagnetic force generated by the valve-closing electromagnet (32, 46) is smaller as the distance from the valve-closing electromagnet (32, 46) is longer and the distance from the axis of the upper electromagnetic coil 46 is longer, the protruding portion 80 is preferably provided in the vicinity of the periphery of the surface of the armature 54 that faces the valve-closing electromagnet (32, 46).

With the protruding portion 80 thus provided on the armature 54 as described above, the electromagnetic force of the valve-closing electromagnet (32, 46) is more likely to be applied to the peripheral portion of the armature 54. Thus, the electromagnetic force of the valve-closing electromagnet (32, 46) is more likely to act on the armature 54 located at the neutral position, as compared with the electromagnetic force of the valve-opening electromagnet (34, 48).

If the driving circuits 72 and 74 are controlled during start control so as to move the armature 54 to the valve-closing terminal position, the solenoid-operated valve 10 can be surely started without increasing the amount of electric power consumption required for the start control. Furthermore, if the initial exciting current is applied to the upper electromagnetic coil 46 during start control, the amount of electric power consumption required for the start control can be further reduced.

While the protruding portion 80 is provided at a portion of the armature 54 that faces the valve-closing magnet (32, 46) in the example of FIG. 21, a protruding portion may be provided at a portion of the armature 54 that faces the valve-opening magnet (34, 48). In the case where the protruding portion is provided at a portion of the armature 54 that faces the valve-opening electromagnet (34, 48), however, the armature 54 is arranged to be moved to the opening-side terminal position during start control.

In the eleventh embodiment, the protruding portion 80 is provided on the surface of the armature 54 that faces the valve-closing electromagnet (32, 46) so that the armature 54 located at the neutral position is more likely to be moved in the valve-closing direction than in the valve-opening direction. However, instead of providing the protruding portion 80, the magnetic permeability at the surface of the armature 54 facing the valve-closing electromagnet (32, 46) may be made higher than that at the surface facing the valve-opening electromagnet (34, 48), or the magnetic permeability of the upper core 32 may be made higher than that of the lower core 34. In these cases, the electromagnetic force applied from the valve-closing electromagnet (32, 46) to the armature 54 becomes larger than the electromagnetic force applied from the valve-opening electromagnet (34, 48) to the armature 54, and therefore the armature 54 becomes more likely to be moved in the valve-closing direction than in the valve-opening direction.

Thus, when the driving circuits 72 and 74 are controlled during start control so as to move the armature 54 to the closing-side terminal position, the solenoid-operated valve 10 can be surely started without increasing the amount of electric power consumption required for the start control. Furthermore, since the neutral position of the armature 54 need not be shifted to the valve-closing side, the amount of exciting current to be applied to the valve-opening electromagnet (34, 48) for moving the armature 54 in the valve-opening direction can be reduced as compared with the case where the neutral position of the armature 54 is shifted to the valve-closing side.

In the first through eleventh embodiments as described above, the internal combustion engine 100 is a four-stroke, four-cycle gasoline engine provided with four cylinders, and each cylinder has two solenoid-operated valves of an intake system and two solenoid-operated valves of an exhaust system. However, the invention may also be applied to other types of engines.

What is claimed is:

1. A method of controlling starting of a solenoid-operated valve of an internal combustion engine in which an armature that moves along with a valve body of an intake valve or an exhaust valve is resiliently supported by a pair of elastic members at a neutral position between an opening-side terminal position and a closing-side terminal position, comprising the step of:

determining one of the opening-side terminal position and the closing-side terminal position which the armature is more likely to reach from the neutral position than the other terminal position, upon a start of the starting period of the solenoid-operated valve; and moving the armature to one of the opening-side terminal position and the closing-side terminal position to which the armature is more likely to be moved than to the other terminal position, during a starting period of the solenoid-operated valve.

2. The method according to claim 1, wherein:

when the one position to which the armature is more likely to be moved is different from a predetermined target position, the armature is moved to the target position after being moved to the one position to which the armature is more likely to be moved.

3. The method according to claim 2, wherein:

one of the opening-side terminal position and the closing-side terminal position which the armature is more likely to reach from the neutral position is determined as a provisional target position upon a start of the starting period of the solenoid-operated valve; and the armature is moved to the target position after being moved to the provisional target position.

4. The method according to claim 1, wherein:

the solenoid-operated valve is constructed such that the armature located at the neutral position is more likely to be moved to one of the opening-side terminal position and the closing-side terminal position than to the other terminal position; and the armature is moved to said one of the opening-side terminal position and the closing-side terminal position during the starting period of the solenoid-operated valve.

5. A start control apparatus for controlling starting of a solenoid-operated valve of an internal combustion engine, the solenoid-operated valve comprising an armature that moves along with a valve body of an intake valve or an exhaust valve, and a pair of elastic members that resiliently support the armature at a neural position between a valve-opening electromagnet and a valve-closing electromagnet, wherein:

the armature is constructed so as to be more likely to be moved to one of an opening-side terminal position and a closing-side terminal position than to the other terminal position, and the valve-opening electromagnet or the valve-closing electromagnet is controlled so as to move the armature toward said one of the opening-side terminal position and the closing-side terminal position during a starting period of the solenoid-operated valve, and wherein a provisional target position determining unit determines one of the opening-side terminal position and the closing-side terminal position which the armature is more likely to reach from the neutral position than the other terminal position, upon a start of the starting period of the solenoid-operated valve.

6. The start control apparatus according to claim 5, wherein the neutral position of the armature is shifted from a middle position between the valve-opening electromagnet and the valve-closing electromagnet toward said one of the opening-side terminal position and the closing-side terminal position.

7. The start control apparatus according to claim 6, wherein said one of the opening-side terminal position and the closing-side terminal position is the closing-side terminal position.

8. The start control apparatus according to claim 6, wherein said one of the opening-side terminal position and the closing-side terminal position is the closing-side terminal position when the armature moves along with the intake valve, and is the opening-side terminal position when the armature moves along with the exhaust valve.

9. The start control apparatus according to claim 5, wherein a protrusion is provided on one of an opening-side surface and a closing-side surface of the armature that faces said one of the opening-side terminal position and the closing-side terminal position.

10. The start control apparatus according to claim 5, wherein one of an opening-side surface and a closing-side surface of the armature that faces said one of the opening-side terminal position and the closing-side terminal position has a higher magnetic permeability than the other surface.

11. The start control apparatus according to claim 5, wherein the solenoid-operated valve further comprises a mechanism that keeps the armature at the other terminal position.

12. A start control apparatus for controlling starting of a solenoid-operated valve of an internal combustion engine, the solenoid-operated valve comprising an armature that moves along with a valve body, a pair of elastic members disposed on opposite sides of the armature for urging the armature toward a neutral position between a fully open position and a fully closed position of the valve body, a valve-opening electromagnet that generates electromagnetic force against elastic force of one of the pair of the elastic members so as to move the armature toward an opening-side terminal position corresponding to the fully open position, and a valve-closing electromagnet that generates electromagnetic force against elastic force of the other of the pair of the elastic members so as to move the armature toward a closing-side terminal position corresponding to the fully closed position, the control apparatus being adapted to move the armature from the neutral position to the opening-side terminal position or the closing-side terminal position as a predetermined target position during a starting period of the solenoid-operated valve, comprising:

a provisional target position determining unit that determines, as a provisional target position, one of the opening-side terminal position and the darling-side terminal position which the armature is more likely to reach from the neutral position than the other terminal position, upon a start of the starting period of the solenoid-operated valve; and a controller that controls the valve-opening electromagnet or the valve-closing electromagnet so as to move the armature to the provisional target position determined by the provisional target position determining unit, and subsequently moves the armature to the predetermined target position.

13. The start control apparatus according to claim 12, wherein:

the provisional target position determining unit comprises a storage unit that stores a provisional target position that is obtained in advance with respect to the solenoid-operated valve; and the provisional target position determining unit determines the provisional target position based on the provisional target position stored in the storage unit.

14. The start control apparatus according to claim 13, wherein:

the provisional target position determining unit further comprises a temperature detector that detects a temperature of the internal combustion engine;

the storage unit stores a relationship between the temperature of the engine and the provisional target position, the relationship being obtained in advance with respect to the solenoid-operated valve; and the provisional target position determining unit determines the provisional target position based on the temperature of the engine detected by the temperature detector and the relationship stored in the storage unit.

15. The start control apparatus according to claim 14, wherein:
   the controller comprises a position detector that detects a position of the armature;
   the provisional target position determining unit judges the provisional target position based on the neutral position detected by the position detector immediately before a start of the starting period of the solenoid-operated valve, the opening-side terminal position detected by the position detector immediately after completion of the starting period of the solenoid-operated valve, and the closing-side terminal position detected by the position detector immediately after completion of the starting period of the solenoid-operated valve; and
   the positional target position determining unit updates the relationship stored in the storage unit, based on a result of judgment of the provisional target position and the temperature of the engine detected by the temperature detector.

16. The start control apparatus according to claim 14, wherein:
   the controller comprises a position detector that detects a position of the armature;
   the provisional target position determining unit judges the provisional target position based on the opening-side terminal position detected by the position detector immediately before termination of an operation of the internal combustion engine, the closing-side terminal position detected by the position detector immediately before termination of the operation of the engine, and the neutral position detected by the position detector when the armature stands still after termination of the operation of the engine; and
   the provisional target position determining unit updates the relationship stored in the storage unit, based on a result of judgment of the provisional target position and the temperature of the engine detected by the temperature detector.

17. The start control apparatus according to claim 14, wherein:
   the provisional target position determining unit judges the provisional target position based on an integrated value of exciting current applied to the valve-opening electromagnet which is obtained while the engine is in a first operating state and an integrated value of exciting current applied to the valve-closing electromagnet which is obtained while the engine is in a second operating state; and
   the provisional target position determining unit updates the relationship stored in the storage unit based on a result of judgment of the provisional target position and the temperature of the engine detected by the temperature detector.

18. The start control apparatus according to claim 14, wherein:
   the provisional target position determining unit comprises a velocity detector that detects a velocity of a member that moves along with the valve body;
   the provisional target position determining unit judges the provisional target position based on the maximum velocity of the member that moves in a valve-opening direction and the maximum velocity of the member that moves in a valve-closing direction, which are detected by the velocity detector during an operation of the engine; and the provisional target position determining unit updates the relationship stored in the storage unit, based on a result of judgment of the provisional target position and the temperature of the engine detected by the temperature detector.

19. The start control apparatus according to claim 14, wherein:
   the solenoid-operated valve includes a lash adjuster disposed between the valve body and the armature;
   the storage unit of the provisional target position determining unit stores first and second relationships between the temperature of the engine and the provisional target position, which relationships are obtained in advance with respect to the solenoid-operated valve, the provisional target position determining unit further comprising an elapsed time detector that detects an elapsed time form a point of time when the last operation of the engine is finished;
   the controller comprises a position detector that detects a position of the armature of the solenoid-operated valve;
   the provisional target position determining unit determines the provisional target position based on the temperature of the engine detected by the temperature detector and the first relationship when the elapsed time is equal to or greater than a reference value, judges the provisional target position based on the neutral position detected by the position detector immediately before a start of the starting period of the solenoid-operated valve, the opening-side terminal position detected by the position detector immediately after completion of the starting period of the solenoid-operated valve, and the closing-side terminal position detected by the position detector immediately after completion of the starting period of the solenoid-operated valve, and updates the first relationship based on the temperature of the engine detected by the temperature detector and a result of judgment of the provisional target position; and
   the provisional target position determining unit determines the provisional target position based on the temperature of the engine detected by the temperature detector and the second relationship when the elapsed time is less than the reference value, judges the provisional target position based on the opening-side terminal position detected by the position detector immediately before termination of the operation of the engine, the closing-side terminal position detected by the position detector immediately before termination of the operation of the engine, and the neutral position detected by the position detector when the armature stands still after termination of the operation of the engine, and updates the second relationship based on the temperature of the engine detected by the temperature detector and a result of judgment of the provisional target position.

20. The start control apparatus according to claim 12, wherein:
   the controller comprises a position detector that detects a position of the armature:
   the provisional target position determining unit comprises a storage unit and a temperature detector that detects a temperature of the internal combustion engine, the storage unit storing a first relationship between the temperature of the engine and an output value of the position detector when the armature is located at the opening-side terminal position and a second relationship between the temperature of the engine and an output value of the position detector when the armature is located at the closing-side terminal position;

the provisional target position determining unit estimates output values of the position detector when the armature is located at the opening-side terminal position and the closing-side terminal position, respectively, based on the temperature of the engine detecting by the temperature detector upon a start of the starting period of the solenoid-operated valve and the first and second relationships stored in the storage unit; and the provisional target position determining unit determines the provisional terminal position based on the estimated output values and an output value of the position detector actually measured when the armature is located at the neutral position.

21. The start control apparatus according to claim 20, wherein:

the provisional target position determining unit updates the first relationship and the second relationship, based on an output voltage of the position detector actually measured when the armature is located at the opening-side terminal position during an operation of the engine, an output voltage of the position detector actually measured when the armature is located at the closing-side terminal position during the operation of the engine, and the temperature of the engine detected by the temperature detector.

22. The start control apparatus according to claim 12, wherein:

the controller comprises a position detector that detects a position of the armature;

the provisional target position determining unit comprises a storage unit and a temperature detector that detects a temperature of the internal combustion engine;

the storage unit stores a mathematical expression for estimating an output value of the position detector when the armature is located at the opening-side terminal position, based on the temperature of the engine, and a mathematical expression for estimating an output value of the position detector when the armature is located at the closing-side terminal position, based on the temperature of the engine;

the provisional target position determining unit estimates the output value of the position detector when the armature is located at the opening-side terminal position and the output value of the position detector when the armature is located at the closing-side terminal position, based on the temperature of the engine detected by the temperature detector upon a start of the starting period of the solenoid-operated valve and the mathematical expressions stored in the storage unit;

the provisional target position determining unit determines the provisional target position based on an output value of the position detector actually measured when the armature is located at the neutral position and the estimated output values of the position detector; and the provisional target position determining unit updates the mathematical expressions based on the temperature of the engine detected by the temperature detector during an operation of the engine and the output values of the position detector actually measured during the operation of the engine.

23. A start control apparatus for controlling starting of a solenoid-operated valve of an internal combustion engine, the solenoid-operated valve comprising an armature that moves along with a valve body, a pair of elastic means disposed on opposite sides of the armature for urging the armature toward a neural position between a fully open position and a fully closed position of the valve body, a valve-opening electromagnet that generates electromagnetic force against elastic force of one of the pair of the elastic means so as to move the armature toward an opening-side terminal position corresponding to the fully open position, and a valve-closing electromagnet that generates electromagnetic force against elastic force of the other of the pair of the elastic means so as to move the armature toward a closing-side terminal position corresponding to the fully closed position, the control apparatus being adapted to move the armature from the neutral position to the opening-side terminal position or the closing-side terminal position as a predetermined target position during a starting period of the solenoid-operated valve, comprising:

provisional target position determining means for determining, as a provisional target position, one of the opening-side terminal position and the closing-side terminal position which the armature is more likely to reach from the neutral position than the other terminal position, upon a start of the starting period of the solenoid-operated valve; and control means for controlling the valve-opening electromagnet or the valve-closing electromagnet so as to move the armature to the provisional target position determined by the provisional target position determining means, and subsequently moving the armature to the predetermined target position.

24. The start control apparatus according to claim 23, wherein:

the provisional target position determining means comprises storage means for storing a provisional target position that is obtained in advance with respect to the solenoid-operated valve; and the provisional target position determining means determines the provisional target position based on the provisional target position stored in the storage means.

25. The start control apparatus according to claim 24, wherein:

the provisional target position determining means further comprises temperature detecting means for detecting a temperature of the internal combustion engine;

the storage means stores a relationship between the temperature of the engine and the provisional target position, the relationship being obtained in advance with respect to the solenoid-operated valve; and the provisional target position determining means determines the provisional target position based on the temperature of the engine detected by the temperature detecting means and the relationship stored in the storage means.

26. The start control apparatus according to claim 25, wherein:

the control means comprises position detecting means for detecting a position of the armature;

the provisional target position determining means judges the provisional target position based on the neutral position detected by the position detecting means immediately before a start of the starting period of the solenoid-operated valve, the opening-side terminal position detected by the position detecting means immediately after completion of the starting period of the solenoid-operated valve, and the closing-side terminal position detected by the position detecting means immediately after completion of the starting period of the solenoid-operated valve; and the positional target position determining means updates the relationship stored in the storage means, based on a result of judgment of the provisional target position and the temperature of the engine detected by the temperature detecting means.

27. The start control apparatus according to claim 25, wherein:

the control means comprises position detecting means for detecting a position of the armature;

the provisional target position determining means judges the provisional target position based on the opening-side terminal position detected by the position detecting means immediately before termination of an operation of the internal combustion engine, the closing-side terminal position detected by the position detecting means immediately before termination of the operation of the engine, and the neutral position detected by the position detecting means when the armature stands still after termination of the operation of the engine; and the provisional target position determining means updates the relationship stored in the storage means, based on a result of judgment of the provisional target position and the temperature of the engine detected by the temperature detecting means.

28. The start control apparatus according to claim 25, wherein:

the provisional target position determining means judges the provisional target position based on an integrated value of exciting current applied to the valve-opening electromagnet which is obtained while the engine is in a first operating state and an integrated value of exciting current applied to the valve-closing electromagnet which is obtained while the engine is in a second operating state; and the provisional target position determining means updates the relationship stored in the storage means based on a result of judgment of the provisional target position and the temperature of the engine detected by the temperature detecting means.

29. The start control apparatus according to claim 25, wherein:

the provisional target position determining means comprises a velocity detector that detects a velocity of a member that moves along with the valve body;

the provisional target position determining means judges the provisional target position based on the maximum velocity of the member that moves in a valve-opening direction and the maximum velocity of the member that moves in a valve-closing direction, which are detected by the velocity detecting means during an operation of the engine; and the provisional target position determining means updates the relationship stored in the storage means, based on a result of judgment of the provisional target position and the temperature of the engine detected by the temperature detecting means.

30. The start control apparatus according to claim 25, wherein:

the solenoid-operated valve includes a lash adjuster disposed between the valve body and the armature;

the storage means of the provisional target position determining means stores first and second relationships between the temperature of the engine and the provisional target position, which relationships are obtained in advance with respect to the solenoid-operated valve, the provisional target position determining means further comprising elapsed time detecting means for detecting an elapsed time form a point of time when the last operation of the engine is finished;

the control means comprises position detecting means for detecting a position of the armature of the solenoid-operated valve;

the provisional target position determining means determines the provisional target position based on the temperature of the engine detected by the temperature detecting means and the first relationship when the elapsed time is equal to or greater than a reference value, judges the provisional target position based on the neutral position detected by the position detecting means immediately before a start of the starting period of the solenoid-operated valve, the opening-side terminal position detected by the position detecting means immediately after completion of the starting period of the solenoid-operated valve, and the closing-side terminal position detected by the position detecting means immediately after completion of the starting period of the solenoid-operated valve, and updates the first relationship based on the temperature of the engine detected by the temperature detecting means and a result of judgment of the provisional target position; and the provisional target position determining means determines the provisional target position based on the temperature of the engine detected by the temperature detecting means and the second relationship when the elapsed time is less than the reference value, judges the provisional target position based on the opening-side terminal position detected by the position detecting means immediately before termination of the operation of the engine, the closing-side terminal position detected by the position detecting means immediately before termination of the operation of the engine, and the neutral position detected by the position detecting means when the armature stands still after termination of the operation of the engine, and updates the second relationship based on the temperature of the engine detected by the temperature detecting means and a result of judgment of the provisional target position.

31. The start control apparatus according to claim 23, wherein:

the control means comprises position detecting means for detecting a position of the armature:

the provisional target position determining means comprises storage means and temperature detecting means for detecting a temperature of the internal combustion engine, the storage means storing a first relationship between the temperature of the engine and an output value of the position detecting mans when the armature is located at the opening-side terminal position and a second relationship between the temperature of the engine and an output value of the position detecting means when the armature is located at the closing-side terminal position;

the provisional target position determining means estimates output values of the position detecting means when the armature is located at the opening-side terminal position and the closing-side terminal position, respectively, based on the temperature of the engine detecting by the temperature detecting means upon a start of the starting period of the solenoid-operated valve and the first and second relationships stored in the storage means; and the provisional target position determining means determines the provisional terminal position based on the estimated output values and an output value of the position detecting means actually measured when the armature is located at the neutral position.

32. The start control apparatus according to claim 31, wherein:

the provisional target position determining means updates the first relationship and the second relationship, based on an output voltage of the position detecting means actually measured when the armature is located at the opening-side terminal position during an operation of the engine, an output voltage of the position detecting means actually measured when the armature is located at the closing-side terminal position during the operation of the engine, and the temperature of the engine detected by the temperature detecting means.

33. The start control apparatus according to claim 23, wherein:

the control means comprises position detecting means for detecting a position of the armature;

the provisional target position determining means comprises storage means and temperature detecting means for detecting a temperature of the internal combustion engine;

the storage means stores a mathematical expression for estimating an output value of the position detecting means when the armature is located at the opening-side terminal position, based on the temperature of the engine, and a mathematical expression for estimating an output value of the position detecting means when the armature is located at the dosing-side terminal position, based on the temperature of the engine;

the provisional target position determining means estimates the output value of the position detecting means when the armature is located at the opening-side terminal position and the output value of the position detecting means when the armature is located at the closing-side terminal position, based on the temperature of the engine detected by the temperature detecting means upon a start of the starting period of the solenoid-operated valve and the mathematical expressions stored in the storage means;

the provisional target position determining means determines the provisional target position based on an output value of the position detecting means actually measured when the armature is located at the neutral position and the estimated output values of the position detecting means; and the provisional target position determining means updates the mathematical expressions based on the temperature of the engine detected by the temperature detecting means during an operation of the engine and the output values of the position detecting means actually measured during the operation of the engine.

* * * * *